(12) United States Patent
Lau

(10) Patent No.: US 10,245,923 B1
(45) Date of Patent: Apr. 2, 2019

(54) AUTOMOBILE AIR FRAGRANCE DIFFUSER SYSTEM

(71) Applicant: Michael Stephen Lau, Houston, TX (US)

(72) Inventor: Michael Stephen Lau, Houston, TX (US)

( * ) Notice: Subject to any disclaimer, the term of this patent is extended or adjusted under 35 U.S.C. 154(b) by 0 days.

(21) Appl. No.: 16/164,805

(22) Filed: Oct. 19, 2018

Related U.S. Application Data

(63) Continuation-in-part of application No. 16/112,031, filed on Aug. 24, 2018.

(51) Int. Cl.
*B01F 3/04* (2006.01)
*B60H 3/00* (2006.01)

(52) U.S. Cl.
CPC ....... *B60H 3/0035* (2013.01); *B01F 3/04021* (2013.01); *B01F 3/04056* (2013.01); *B60H 3/0014* (2013.01); *B60H 2003/0042* (2013.01)

(58) Field of Classification Search
CPC ..... B01F 3/04; B01F 3/04021; B01F 3/04056
USPC ......................................... 261/78.2, DIG. 88
See application file for complete search history.

(56) References Cited

U.S. PATENT DOCUMENTS

| | | | |
|---|---|---|---|
| 6,197,263 B1 | 3/2001 | Blount | |
| 7,878,418 B2 * | 2/2011 | Sevy | A61M 11/06 128/200.18 |
| 8,196,902 B1 | 6/2012 | Pystin | |
| 8,931,712 B2 | 1/2015 | Nagano | |
| 9,308,287 B2 | 4/2016 | Wolf | |
| 10,024,476 B2 * | 7/2018 | Morishita | B60H 1/32 |
| 2016/0213802 A1 | 7/2016 | Scheer | |

* cited by examiner

*Primary Examiner* — Robert A Hopkins
(74) *Attorney, Agent, or Firm* — Kanika Radhakrishnan; Evergreen Valley Law Group

(57) ABSTRACT

The present disclosure provides an air fragrance diffuser system. The system includes an atomizer device for storing fragrance oil and an air pressure generating source integrated within the atomizer device. The air pressure generating source supplies pressurized air within the atomizer device for converting the fragrance oil into vapors. A transmission system is coupled to the atomizer device for receiving a mixture of the vapors and the pressurized air, for transmitting the mixture into a passenger compartment of the automobile. The present disclosure is configured to provide a compact diffuser system for diffusing or routing vapors of the fragrance into the passenger compartment.

20 Claims, 14 Drawing Sheets

AUTOMOBILE AIR FRAGRANCE DIFFUSER SYSTEM

TECHNICAL FIELD

The present disclosure generally relates to an air fragrance diffuser system and, more particularly, to the air fragrance diffuser system integrated within an automobile for freshening the air within a passenger compartment of the automobile.

BACKGROUND

Generally, unpleasant odor develops inside a passenger compartment of an automobile despite maintenance of the passenger compartment. For instance, eating or smoking in the passenger compartment of the automobile may cause the unpleasant odor. Such odor can be vented out of windows of the automobile. However, venting out the unpleasant odor through the windows may not be feasible most of the time due to harsh weather conditions or many other reasons. In some cases, an unpleasant odor may also arise from an air-conditioning ventilation system due to accumulation of a moisture therein, which that enables growth of microorganisms. The microorganisms thrive on the humidity in the ventilating system and may cause the unpleasant odor inside the passenger compartment. An owner/driver of the automobile may find it difficult to clean the air-conditioning ventilation system regularly as disassembling the air-conditioning system and assembling it every time may be tedious.

Various devices such as air fragrance dispensers for reducing the odor and providing an alluring aroma have been traditionally used in automobiles. These air fragrance dispensers are used in the automobiles and other enclosed environments for freshening the unpleasant air and providing a pleasing aroma. Some fragrance dispensers may not require a power supply. For example, evaporation techniques may be employed by the diffuser device to evaporate fragrance oils from a collecting receptacle to release fragrances in the car. These types of air-fresheners are mounted on Heating, Ventilation, and Air Conditioning (HVAC) vents of the automobile. However, a drawback in such a fragrance dispenser/diffuser is that the fragrance oil may be made of artificial fragrances, for example, chemicals derived from ethanol, formaldehyde, and phenol etc. The artificial fragrance derived from these chemicals lasts only for a short period of time, and consequently their containers may have to be constantly replaced or replenished. Moreover, these chemicals have a high evaporation rate so one must ensure that the chemicals do not evaporate quickly in high-temperature environment which increases the rate of evaporation.

In some scenarios, an adverse effect of using chemicals in the fragrance dispenser arise when the chemical is diluted (e.g. Mixed with water) to cut the evaporation rate which ultimately slows down an effect of eliminating/suppressing the odor. Moreover, the fragrance dispensers only diffuse fragrance (aroma) via a single vent where they are mounted. This reduces the amount of fragrance released in the automobile as the fragrance dispenser can store only a limited amount of chemicals due to a size of the collecting receptacle. Moreover, high exposure to fragrances emitted by the chemicals leads to an increase in inhalation of the chemicals harmful to health such as causing breathing problems. Accidental consumption or rubbing of these chemicals on skin and eyes can cause allergies or other forms of sickness. Additionally, extra care must be taken to ensure that the fragrance dispenser is out of reach of the children. In some cases, the fragrance dispenser may not have any provision to stop the diffusion process of fragrance even when there is no one sitting in the passenger compartment. This tends to reduce working life-cycle of the fragrance oil (chemical fragrance) present in the fragrance dispenser.

There are other strong fragrance diffuser systems that operate on a high-power source and need consistent power, by plugging into one of the available power supply ports. In such fragrance diffuser systems, the conversion of fragrance oil into a fragrance mist is achieved by a heating power source placed inside the fragrance diffuser system for evaporating the fragrance oil. However, the drawback of such fragrance diffuser system is that heating of the fragrance oil destroys chemical properties of the fragrance oil and, comparatively, limits the intensity of aroma produced by a natural evaporation of the fragrance oil during diffusion. Further, uniform diffusion of the fragrance mist in the passenger compartment is not achieved, as the heated fragrance vapors do not uniformly distribute the fragrance within the compartment.

In light of the above, all existing solutions are short-lived and often require constant attention from the person desiring a good aroma in the passenger compartment of the automobile. Moreover, there is a need to replace the chemical fragrance solutions by suitable natural fragrance solution, which is beyond the reach of occupants of the automobile and is not harmful to the health of human beings, but instead offer healing properties such as boosting resilience against cold and flu, reduces inflammation in the lungs, relieving congestion and soothing respiratory illnesses etc. In view of the above, there is a need for a powerful and efficient system which converts fragrance oil into fragrance mist without harming its chemical properties and is configured to disperse fragrance from the fragrance dispenser uniformly in the passenger compartment and maintain consistency in an intensity of fragrance oil diffusion throughout the passenger compartment.

SUMMARY

Various embodiments of the present disclosure provide an integrated automobile ventilation fragrance system used for diffusing fragrance mist into a passenger compartment of an automobile through suitable transmission means including but not limited to Heating, Ventilation, and Air Conditioning (HVAC) ventilation system of the automobile.

An embodiment of the present disclosure provides an air fragrance diffuser system. The system includes an atomizer device for storing fragrance oil and an air pressure generating source integrated within the atomizer device. The air pressure generating source supplies pressurized air within the atomizer device for converting the fragrance oil into vapors. A transmission system is coupled to the atomizer device for receiving a mixture of the vapors and the pressurized air, for transmitting the mixture into a passenger compartment of the automobile.

Another embodiment of the present disclosure provides an air fragrance diffuser system. The air fragrance diffuser system includes a power source, an electronic control system communicably coupled with a wireless transceiver associated with a user and with a wireless power transceiver unit. The system also includes an atomizer device for storing a fragrance oil and an air pump is provided in the system for supplying the pressurized air to the atomizer device via a first air delivery conduit, the pressurized air configured to convert the fragrance oil into a fragrance mist. The air pump is integrated within the atomizer device and comprises an inlet port configured to receive atmospheric air, a chamber configured to compress the atmospheric air, and an outlet port configured to deliver pressurized air to the atomizer device via the first air delivery conduit. A transmission system is provided in the system, the transmission system includes a second air delivery conduit pneumatically and fluidically coupled to the atomizer device for receiving the fragrance mist and configured to transmit the fragrance mist to a passenger compartment of an automobile through a Heating, Ventilation, and Air Conditioning (HVAC) system of the automobile. The HVAC system comprises an HVAC ventilation chamber pneumatically and fluidically coupled to the second air delivery conduit for receiving the fragrance mist and configured to transmit a mixture of the fragrance mist and a HVAC generated air into an HVAC ventilation line for blowing the mixture into the passenger compartment.

Another embodiment of the present disclosure provides an air fragrance diffuser system for an automobile. The air fragrance diffuser system includes a power source, an electronic control system communicably coupled with a wireless transceiver associated with a user of the automobile and to a wireless power transceiver unit. The system also includes a plurality of atomizer devices each of the plurality of atomizer devices including an inlet port and an outlet port. At least one air pump is integrated within each of the plurality of atomizer devices, each of the at least one air pump configured to supply a pressurized air to each of the plurality of atomizer devices via a first electronic valve hub for converting a fragrance oil stored within each of the plurality of atomizer devices into a fragrance mist via the pressurized air. The first electronic valve hub includes an inlet and a plurality of outlets, the first electronic valve hub is pneumatically coupled to a first air delivery conduit coupled to each of the at least one air pump for receiving the pressurized air and configured to be electronically controlled by the electronic control system for selectively transmitting the pressurized air through the plurality of outlets. A second electronic valve hub is provided, which includes a plurality of inlets and an outlet, wherein each of the plurality of inlets are pneumatically and fluidically coupled to each of the output ports of the plurality of atomizer devices for receiving the fragrance mist. A transmission system is provided in the system, which is pneumatically and fluidically coupled to the outlet of the second electronic valve hub for receiving the fragrance mist and routing the fragrance mist to a passenger compartment of the automobile.

BRIEF DESCRIPTION OF THE DRAWINGS

The disclosure itself, together with further features and advantages, will become apparent from consideration of the following brief description, taken in conjunction with the accompanying drawings. One or more embodiments of the present disclosure are now described, by way of example only wherein like reference numerals represent like elements and in which.

Figure 1:
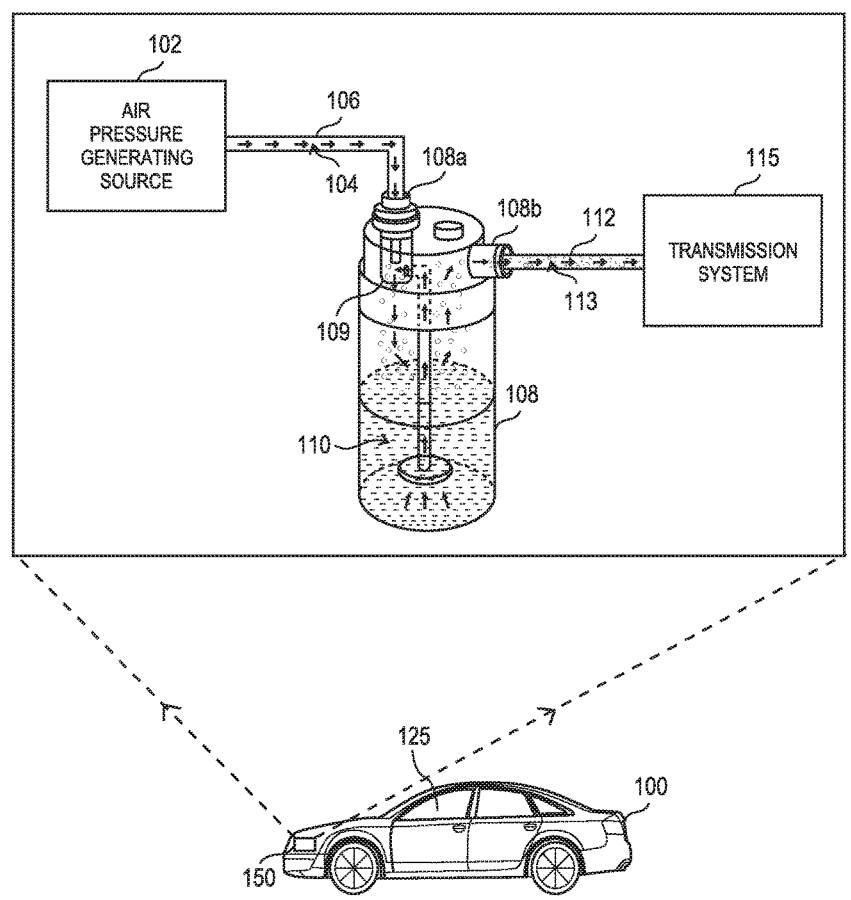
FIG. 1 illustrates a simplified schematic representation of an air fragrance diffuser system for an automobile, in accordance with an example embodiment of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems and methods are shown in schematic line diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Various example embodiments of the present disclosure provide an air fragrance diffuser system for providing fragrance mist to a passenger compartment of an automobile via transmission channels such as existing ventilation systems or using separate vents.

The air fragrance diffuser system, described herein, can be positioned within the hood of the automobile, so that the whole diffuser system is concealed from the occupants of the automobile. The diffuser system includes an atomizer device that receives pressurized air flow from an air pressure generating source. As the pressurized air is received in the atomizer device, the atomizer device produces aerosol fragrance which is channeled through suitable ventilation systems (also referred to as 'vents') into the passenger compartment of the automobile. Examples of the ventilation systems can be existing vents of Heating, Ventilation, and Air Conditioning (HVAC) system of the automobile or vents dedicated for the diffuser system. The diffuser system is communicably coupled to a user device such as a wireless transceiver to control an operation and refill of the diffuser systems depending upon preferences of the user.

Various embodiments of the air fragrance diffuser system for use in the automobile are described herein with reference to FIGS. 1 through 15.

FIG. 1 illustrates a simplified schematic representation of an air fragrance diffuser system 150 according to an embodiment of the present disclosure. The air fragrance diffuser system 150 may be coupled with vents of a climate-controlled system of an automobile 100 to enable the fragrance (in form of aerosol) to mix with the air before being blown into a cabin (e.g., a passenger compartment 125) of the automobile 100. An example of the climate-controlled system can be HVAC system of the automobile 100. Alternatively, or additionally, the air fragrance diffuser system 150 may have its own transmission system that can directly blow the aerosol mixed with air into the passenger compartment 125.

The air fragrance diffuser system 150 includes an air pressure generating source 102, a first air delivery conduit 106, an atomizer device 108, a second air delivery conduit 112, and a transmission system 115. The air pressure generating source 102 is configured to convert atmospheric air into pressurized air (see, 104). An example of the air pressure generating source 102 may be an air pump. Some other examples of the air pressure generating source 102 may include a blower or a compressor for pressurizing the atmospheric air. The air pressure generating source 102 is pneumatically coupled to the atomizer device 108 via the first air delivery conduit 106 and is configured to provide the pressurized air 104 to the atomizer device 108. In one form, the atomizer device 108 is a sealed container that is configured to store a fragrance oil 110. Without loss of generality, the sealed container can be of any shape such as cylindrical, cubical, spherical, etc. The fragrance oil 110 can be any type of oil that can be used for the fragrance purposes.

In an embodiment, the atomizer device 108 includes a cylindrical sealed chamber comprising an inlet port 108a, an outlet port 108b and a housing 109 configured within the sealed chamber. The inlet port 108a is configured to receive the pressurized air 104 from the air pressure generating source 102 and is configured to provide the pressurized air 104 to the housing 109. A pressure level of the pressurized air 104 is decreased in the housing 109 to provide a low pressurized air with an increased velocity to increase the vaporization of the fragrance oil 110. It should be noted that the conversion of the pressurized air 104 to the low pressurized air in the housing 109 is due to a pressure drop in the inlet port 108a that may be achieved by means of an orifice. A high velocity of the low pressurized air causes conversion of the fragrance oil 110 in the atomizer device 108 into vapors thereby enabling the vapors of the fragrance oil 110 to mix with the low pressurized air to constitute a mixture 113 (e.g., an aerosol). The mixture 113 is hereinafter interchangeably referred to as a fragrance mist 113. The fragrance mist 113 is ported out via the outlet port 108b and the second air delivery conduit 112 to the transmission system 115. The second air delivery conduit 112 is configured to provide the fragrance mist 113 which is a homogenous mixture of vapors (of the fragrance oil 110) and a low pressurized air into the transmission system 115. In an embodiment, the transmission system 115 is configured to transmit the fragrance mist 113 into the automobile cabin 125 (also referred to as 'a passenger compartment') through the HVAC vents of the automobile 100. Alternatively, the transmission system 115 may not use the HVAC vents and can directly blow the fragrance mist 113 into the cabin 125 with or without using a separate fan or blower.

Figure 2:
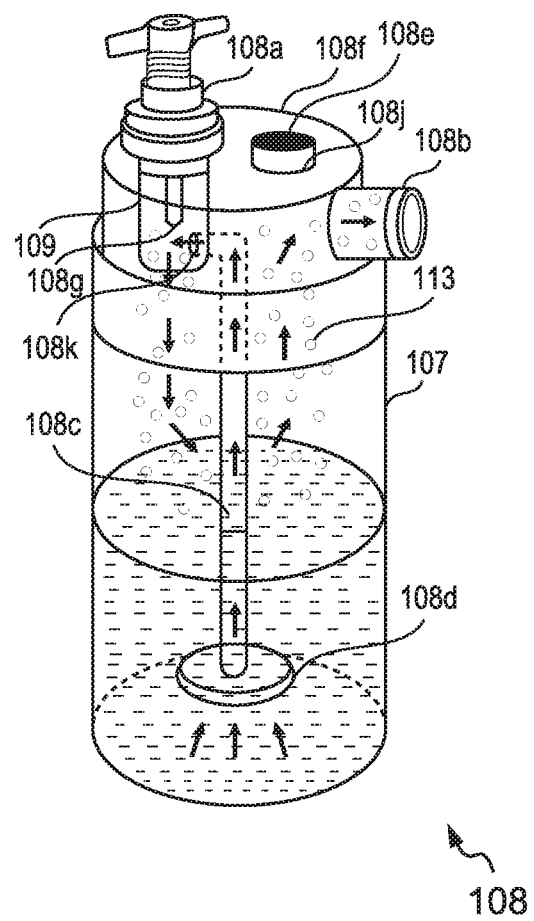
FIG. 2 illustrates a schematic representation of an atomizer device of the air fragrance diffuser system of FIG. 1, in accordance with an example embodiment of the present disclosure.

Referring now to FIG. 2, a schematic representation of the atomizer device 108 of the fragrance diffuser system of FIG. 1 is illustrated, in accordance with an example embodiment of the present disclosure. The atomizer device 108 includes a sealed enclosed chamber 107 for storing the fragrance oil 110. In the illustrated embodiment of FIG. 2, the sealed enclosed chamber 107 is shown with cylindrical configuration, however it can have any other shape that is suitable for storing the fragrance oil 110.

The atomizer device 108 includes the inlet port 108a, the outlet port 108b, and the housing 109. In an example, the inlet port 108a is a hollow cylindrical tube mounted on a top surface 108f of the atomizer device 108 and is configured to deliver the pressurized air 104 to the housing 109 via a jet orifice 108g. Without loss of generality, the outlet port 108b is a hollow cylindrical tube positioned on an outer circumferential surface of the atomizer device 108, particularly on top portion of the atomizer device 108. The output port 108b is configured to port the fragrance mist 113 to the automobile cabin 125 via HVAC vents in the automobile 100 or through other similar vents.

The housing 109 is a hollow cylindrical tube having both open ends coaxially mounted below the inlet port 108a. The jet orifice 108g is configured coaxially in the housing 109 such that the pressurized air received through the inlet port 108a can pass through the jet orifice 108g at a higher speed.

The atomizer device 108 includes a siphon tube 108c and a filter 108d. The siphon tube 108c is configured to draw the fragrance oil 110 from the sealed enclosed chamber 107. A portion of the siphon tube 108c including an outlet 108k is positioned within the housing 109 such that the outlet 108k is juxtaposed to the jet orifice 108g to allow the drawn fragrance oil 110 to interact with the air emanated from the jet orifice 108g. The siphon tube 108c can be configured in the atomizer device 108 in a variety of ways and configurations. For instance, in one form, the siphon tube 108c can be supported on the housing 109 such that the outlet 108k of the siphon tube 108c extends into the housing 109 juxtaposed to the jet orifice 108g, and the siphon tube 108c extends perpendicularly downwards into the atomizer device 108. As shown in FIG. 2, the siphon tube 108c is a hollow tubular inverted T-shaped structure. The siphon tube 108c is configured to draw the fragrance oil 110 from the atomizer device 108 via the filter 108d and passes the drawn fragrance oil 110 into the housing 109 via the outlet 108k. The fragrance oil 110 enters the housing 109 via the outlet 108k of the siphon tube 108c through a principle of siphoning process.

In one form, the filter 108d of the atomizer device 108 is a circular mesh filter mounted on the inlet (not shown) of the siphon tube 108c coaxially to the siphon tube 108c and parallel to the top surface 108f (or a bottom surface) of the atomizer device 108. The filter 108d is configured to filter the fragrance oil 110 before providing the fragrance oil 110 to the inlet of the siphon tube 108c to restrict dirt and minute adulterated solid particles present in the fragrance oil 110 from entering the siphon tube 108c.

The atomizer device 108, at the top surface 108f, includes an opening 108j for pouring the fragrance oil 110 when there is a need to refill the atomizer device 108. The opening 108j can be covered using a lid 108e. The lid 108e of the atomizer device 108 is a circular shape cover mounted on the top surface 108f of the atomizer device 108. The lid 108e is configured to cover the opening 108j of the atomizer device 108.

The pressurized air 104 entering the housing 109 via the jet orifice 108g is reduced to low pressurized air having a high velocity. This low pressurized air inside the housing 109, particularly at the outlet 108k of the siphon tube 108c results in siphoning the fragrance oil 110 from the atomizer device 108. The fragrance oil 110 moving out via the outlet 108k of the siphon tube 108c into the housing 109 interacts with the high velocity low pressurized air which shears the fragrance oil 110 into fine liquid droplets (vapors). This process of converting the fragrance oil 110 into vapors is called atomization of the fragrance oil 110, and it works on the jet nebulization process. The atomizer device 108 is configured to store both the fragrance oil 110 and the vapors (of the fragrance oil 110). The atomizer device 108 is equipped with effective sealing mechanisms to restrain vapors from leaving the atomizer device 108, when the air fragrance diffuser system 150 is not operating (i.e. when the air pressure generating source 102 is switched OFF). The mechanical design (structure) of the atomizer device 108 and placement of the inlet port 108a is done to promote uniform mixing of the low pressurized air with the vapors to form the fragrance mist 113.

Figure 3:
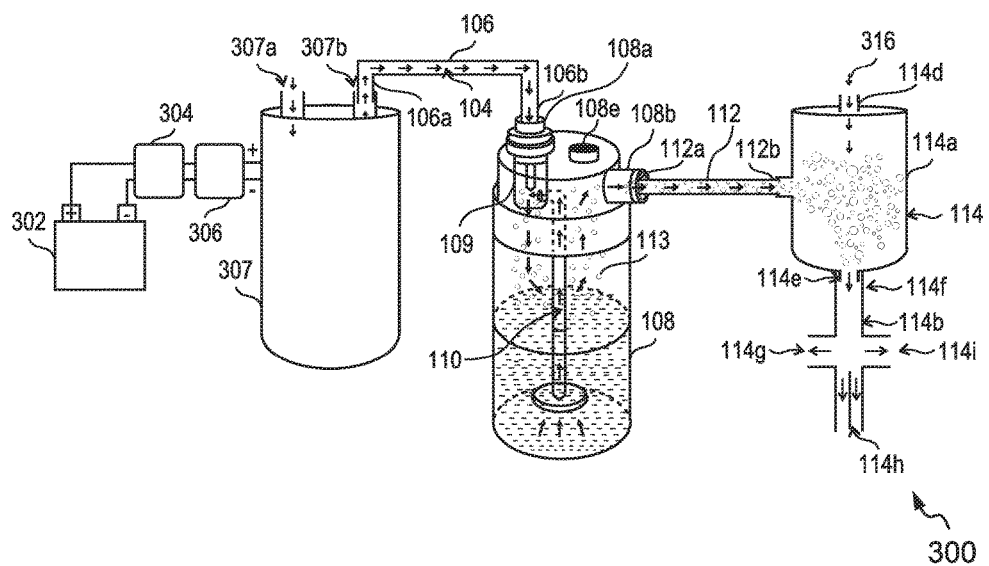
FIG. 3 illustrates a schematic representation of the air fragrance diffuser system for use in an automobile, in accordance with an example embodiment of the present disclosure.

Referring now to FIG. 3, a schematic representation of the fragrance diffuser system of FIG. 1 is illustrated in accordance with an example embodiment of the present disclosure.

Embodiment of the present disclosure provide a fragrance diffuser system 300 for an automobile including several components assembled together to perform the required operation: a battery 302, a fuse box 304, an electronic control circuit 306, an air pressure generating source such as an air pump 307, the first air delivery conduit 106, the atomizer device 108, the second air delivery conduit 112 and an HVAC ventilation system 114.

In an example embodiment, the battery 302 works on direct current and is configured to power components (or provide electrical power) of the fragrance diffuser system 300. The battery 302 includes positive and negative terminals electrically coupled to the air pump 307 through the fuse box 304. The electronic control circuit 306, powered by the battery 302, is configured to control working of the air pump 307 by controlling power supply from the battery 302 to the air pump 307. Such controlled operation of the air pump 307 is used to control a flow of the fragrance mist 113 into the automobile cabin (e.g., the passenger compartment 125).

In at least one example embodiment, the electronic control circuit 306 is configured to provision power supply from the battery 302 only when an HVAC system (not shown in FIG. 2) of the automobile 100 is switched ON. Alternatively, the power supply to the air pump 307 is disconnected/disabled when the HVAC system is switched OFF. In at least one example representation, the air pump 307 is compact, of miniature size and its specification is described in terms of "CFM" (cubic foot per minute), horsepower, working pressure, cost factor and compression ratio. It shall be noted that a rate of generation of the fragrance mist 113 depends on the specification of the pressure generating source 102 such as the air pump 307. The air pump 307 may be any air pump known in the art or to be developed. Alternatively, a compressor or a blower for pressurizing the atmospheric air to provide the pressurized air 104 can be used. Examples of the air pump 307 include, but are not limited to, a screw air pump, a rotary lobe air pump, a piston pump and a vane air pump.

In an embodiment, the air pump 307 is configured to compress the atmospheric air to generate the pressurized air 104. The air pump 307 includes an inlet port 307a and an outlet port 307b. In one form, the inlet port 307a is a hollow cylindrical tube eccentrically mounted on a top surface of the air pump 307 and is configured to receive the atmospheric air and guide the air to the air pump blades (not shown) of the air pump 307 for compression. The outlet port 307b is a hollow cylindrical tube eccentrically mounted on the top surface of the air pump 307 oppositely to the inlet port 307a. The outlet port 307b is configured to discharge the pressurized air 104. The outlet port 307b is coupled to the first air delivery conduit 106 through its inlet 106a by means of threading or snap fit mechanism.

The first air delivery conduit 106 is of tubular shape and its outlet 106b is coupled to the atomizer device 108 through the inlet port 108a of the atomizer device 108 by means of threading or a snap fit mechanism. The first air delivery conduit 106 is configured to transmit the pressurized air 104 into the atomizer device 108. An example of the first air delivery conduit 106 can be a metal pipe, a rubber hose or the like.

As explained in FIG. 2, the atomizer device 108 is configured to receive the pressurized air 104 from the air pump 307 and is further configured to supply the fragrance mist 113 into the transmission system 115.

In an embodiment, when the HVAC system is powered ON, the electronic control circuit 306 provisions the power supply from the battery 302 to the air pump 307. The air pump 307 is configured to compress the atmospheric air to generate the pressurized air 104 which is delivered to the atomizer device 108. The atomizer device 108 receives the pressurized air 104 and is configured to reduce the pressure level of the pressurized air 104 into the low pressurized air via the jet orifice 108*g*. The atomizer device 108 is further configured to convert the fragrance oil 110 housed in the atomizer device 108 into vapors using the low pressurized air (jet nebulization process) thereby enhancing the rate of vaporization of the fragrance oil 110. The atomizer device 108 also ensures uniform mixing of the low pressurized air with the vapors of the fragrance oil 110 to form the fragrance mist 113.

In an application scenario, when the HVAC system is powered OFF, the electronic control circuit 306 switches OFF the power supply from the battery 302 to the air pump 307. Therefore, the air pump 307 stops the production of the pressurized air 104 which results in zero transmission of the pressurized air 104 into the atomizer device 108, thereby disabling the fragrance diffuser system 300 from diffusing the fragrance mist 113 into the cabin 125.

The fragrance mist 113 is ported via the outlet port 108*b* to the transmission system 115 and further via the second air delivery conduit 112 of the transmission system 115. For instance, the outlet port 108*b* of the atomizer device 108 is coupled to an inlet 112*a* of the second air delivery conduit 112. The second air delivery conduit 112 is configured to provide the fragrance mist 113, which is a homogenous mixture of vapors (of the fragrance oil 110) and a low pressurized air, into the transmission system 115. In an example embodiment, the second air delivery conduit 112 can directly provide the fragrance mist 113 into the passenger compartment 125 through suitable mechanisms such as blower, fan, or by directly connecting to a suitable opening/vent in the passenger compartment 125.

In at least one embodiment, the transmission system i.e. the second air delivery conduit 112 can provide the fragrance mist 113 using the existing HVAC system 114 of the automobile 100. For instance, in the illustrated representation of FIG. 3, the outlet 112*b* of the second air delivery conduit 112 is fluidically and pneumatically connected to an HVAC ventilation chamber 114*a*.

Without loss of generality, the HVAC ventilation chamber 114*a* is a cube shaped enclosed casing which includes two inlets 114*c*, 114*d*, an outlet 114*e* and a ventilation fan (not shown). The HVAC ventilation chamber 114*a* is configured to provide uniform mixing of the fragrance mist 113 with HVAC generated air 316. A first inlet 114*c* is for charging the fragrance mist 113, a second inlet 114*d* is for charging the HVAC generated air 316, and the outlet 114*e* is used for discharging a mixture of the fragrance mist 113 and the HVAC generated air 316 into a HVAC ventilation line 114*b*. The outlet 114*e* of the HVAC ventilation chamber 114*a* is coupled to the HVAC ventilation line 114*b*.

The HVAC ventilation line 114*b* is a straight vertical tube including an inlet 114*f* and multiple outlets (114*g*-114*i*). The inlet 114*f* is coupled to the outlet 114*e* of the HVAC ventilation chamber 114*a*. Each of the multiple outlets (114*g*-114*i*) of the HVAC ventilation line 114*b* is coupled to each of the HVAC vents located inside the automobile cabin 125 of the automobile 100 via HVAC delivery conduits (not shown).

FIG. 4 illustrates a simplified schematic representation of a fragrance diffuser system 400, in accordance with another example embodiment of the present disclosure.

The fragrance diffuser system 400 includes the battery 302, an electronic control system 402, an air pump 403, a first electronic valve hub 406, a first atomizer device 413, a second atomizer device 414, a third atomizer device 416, a second electronic valve hub 430, and the HVAC ventilation system 114.

In an example embodiment, the battery 302 is configured to provide electrical power to the fragrance diffuser system 400. More specifically, the battery 302 may be electrically connected to input terminals of the electronic control system 402, the air pump 403, the electronic valve hub 406, and the atomizer devices 413, 414 and 416.

The air pump 403 includes an inlet port 403*a* and an outlet port 403*b*. The inlet port 403*a* is configured to receive atmospheric air and guide the air to the air pump blades (not shown) for compression. The outlet port 403*b* is pneumatically coupled to a first air delivery conduit 405 and is configured to discharge the pressurized air 404 there through.

In an embodiment, the air pump 403 employed in FIG. 4 is a modified version of the air pump 307 (referring to FIG. 3), because of its capability to provide variable compression ratio by varying the RPM (Revolutions Per Minute) of the motor (not shown) used for compression. The variable compression ratio is attained by providing variable electric current to the air pump 403. The variable electric current to the air pump 403 may be controlled by the electronic control system 402 which is electrically connected to the air pump 403.

In at least one example embodiment, the intensity of vapors produced are controlled by providing variation in the compression ratio of the air pump 403. The pressure of the pressurized air 404 is directly proportional to the compression ratio of the air pump 403. The pressure of the pressurized air 404 also causes a directly proportional rate of evaporation of fragrance oils 409, 411, 415 into the vapors to form fragrance mist 423, 425, 427, respectively. Therefore, increase in the compression ratio of the air pump 403 causes the increase in the rate of generation of the fragrance mist 423, 425, 427 and vice versa.

The variation in the compression ratio of the air pump 403 can be controlled by the user through a wireless transceiver 434 to increase or decrease the amount of fragrance mist 423, 425, 427 generated from the atomizer devices 413, 414, 416. In at least one example embodiment, the intensity of vapors produced are controlled by supplying power to the air pump 403 intermittently and purposely to reduce an operating duration of the air pump 403. Such intermittent operation helps in reducing the amount of vapors generated from the atomizer devices 413, 414, 416, and accordingly volume and intensity of the fragrance mist 423, 425, and 427 generated from the atomizer devices 413, 414, 416 can be controlled.

The intensity of the fragrance mist 423, 425, and 427 can vary in any combination depending upon durations of ON and OFF states of the air pump 403. In an application scenario, if the air pump 403 remains ON for an entire duration of running of the automobile 100, the intensity level can be considered 100%, and if the air pump 403 remains OFF for the entire duration of running of the automobile 100, the intensity level is considered 0%. Similarly, if the air pump 403 works for half of the automobile's running time, the intensity level can be considered as 50%. In this way, the intensity of the vapors generated from each of the atomizer devices 413, 414, 416 can be controlled by appropriately selecting the ON duration of the air pump 403.

In an embodiment, the first air delivery conduit 405 is pneumatically coupled to the electronic valve hub 406 and is configured to transmit the pressurized air 104 into an inlet 406*a* of the electronic valve hub 406.

Without loss of generality, the electronic valve hub 406 includes the inlet 406*a* and multiple outlets 406*b*-406*d*. The electronic valve hub 406 is configured to split and convey the pressurized air 404 discharging from the inlet 406*a* into the multiple outlets 406*b*-406*d*. The multiple outlets 406*b*-406*d* are coupled to a second air delivery conduit 408, a third air delivery conduit 410 and a fourth air delivery conduit 412, respectively, and are configured to supply split pressurized air into multiple air delivery conduits 408, 410 and 412. The multiple outlets 406*b*-406*d* include valves positioned into the inner surface of the outlets 406*b*-406*d*, where the valves are configured to allow or restrict the split pressurized air 404 into the multiple air delivery conduits 408, 410 and 412.

In an embodiment, the electronic valve hub 406 (hereinafter referred as a 'valve hub 406') is electrically connected to the electronic control system 402 which provides control signals for changing the valve position. The valve hub 406 is configured to change valve position of each of the multiple outlets 406*b*-406*d* between "open position" to "closed position" and vice-versa, including one or more intermediate positions between the open position and the closed position. In one form, when the automobile 100 is turned ON, each valve of the multiple outlets 406*b*-406*d* can be set to attain open position, and these are switched to the closed position only when the fragrance diffuser system 400 is disabled by the user. The user, through the wireless transceiver 434, can control the opening of one or more valves of the multiple outlets 406*b*, 406*c*, 406*d* of the valve hub 406 for discharging the split pressurized air 404.

In an application scenario, the user sends a wireless signal 434*a* through the wireless transceiver 434. The wireless signal 434*a* can be received by the electronic control system 402 through a Bluetooth module (e.g., see, communication module 702*b* in FIG. 7). The electronic control system 402 converts the wireless signal 434*a* to an electrical control signal and further transmits the electric control signal to the valve hub 406 for opening and closing of desired valves of the multiple outlets 406*b*, 406*c*, 406*d*. The user may send the wireless signal 434*a* representing a preference input for a fragrance from among the fragrance oils 409 or 411 or 415. Also, the preference input may represent a desired intensity of fragrance in the passenger compartment 125. For instance, if the user selects a fragrance option 1 in a user interface (UI) in his user device, the wireless signal 434*a* corresponding to the fragrance option 1 is sent to the electronic control system 402. The control system 402 interprets the wireless signal 434*a* and controls the operation of the hubs 404 and 430 such that fragrance mist generated from the atomizer device 413 is only allowed to pass through the transmission system 115.

The wireless transceiver 434 can be any communication device or may be embodied in a user device including a phone, a computer, a personal digital assistant, a notebook, a laptop etc., which can send the wireless signal 434*a*. Without loss of generality, the wireless signal 434*a* can be a Bluetooth signal or radio waves sent from the wireless transceiver 434.

The air delivery conduits 408, 410, 412 are pneumatically coupled to the plurality of the atomizer devices 413, 414, 416. The multiple air delivery conduits 408, 410, 412 are configured to transmit the split pressurized air 404 into the atomizer devices 413, 414, 416.

The atomizer devices 413, 414, 416 are configured to store different flavors of the fragrance oils 409, 411, 415 into them, respectively. The atomizer devices 413, 414, 416 are positioned in such a way that the composite system achieves compactness. In one form, the atomizer devices 413, 414, 416 are positioned in parallel direction with respect to each other. The atomizer devices 413, 414, 416 are configured to receive the pressurized air 404 and further configured to convert the different flavors of the fragrance oils 409, 411, 415 into vapors, and provision for diffusion of the fragrance mist 423 or 425 or 427 into the transmission system 115.

In the fragrance diffuser system 400, the atomizer devices 413, 414 and 416 may be of same configuration. The atomizer devices 413, 414, 416 comprise different flavors of the fragrance oils 409, 411, 415, and diffusion of one or more the fragrance oils 409, 411 and 415 into the passenger compartment 125 via the HVAC ventilation system depends upon the choice of the user. The fragrance oils 409, 411, 415 can be oil including but not limited to lavender oil, *eucalyptus* oil, jasmine oil, jojoba oil, tea tree oil, peppermint oil, rose oil, oregano oil, aromatic oil and rosemary oil.

As shown in the fragrance diffuser system 400, the atomizer devices 413, 414, 416 may be different in configuration with the atomizer device 108 (Referring to FIG. 3) because of addition of baffle disks 413*h*, 414*h*, 416*h* installed within the outlet ports 413*b*, 414*b*, 416*b* of the atomizer devices 413, 414, 416. In some embodiments, the baffle disks 413*h*, 414*h*, 416*h* can also be installed within the inlet ports of the atomizer devices 413, 414, 416. Each of the outlet ports 413*b*, 414*b*, 416*b* of the atomizer devices 413, 414, 416 is of same configuration, and each of the baffle disks 413*h*, 414*h*, 416*h*, which is coaxially secured in the outlet ports 413*b*, 414*b*, 416*b*, respectively, is also of the same configuration. The baffle disks 413*h*, 414*h* 416*h* are configured to provide variation in volume of the fragrance mist 423, 425 and 427 that can be provided to the transmission system 115.

In an embodiment, the atomizer devices 413, 414, 416 are electrically connected to the electronic control system 402 which provides control signals to the baffle disks 413*h*, 414*h* 416*h* for changing the position of the baffle disks 413*h*, 414*h* 416*h*. It should be noted that the position of the baffle disks 413*h*, 414*h* 416*h* can be adjusted to achieve variation in the intensity of vapors in the fragrance mist 423, 425 and 427 supplied to the transmission system 115.

In an embodiment, the atomizer devices 413, 414, 416 are equipped with fluid level sensors 418, 420, 422 secured within the atomizer devices 413, 414, 416, particularly in the lower portion of the atomizer devices 413, 414, 416. A sensing tip (not shown) of each of the fluid level sensors 418, 420, 422 which measures the level of the fragrance oils 409, 411, 415, may be present inside the atomizer devices 413, 414, 416 and immersed into the fragrance oils 409, 411, 415. The fluid level sensors 418, 420, 422 are configured to determine the level of the fragrance oils 409, 411, 415 in the atomizer devices 413, 414, 416, respectively. The fluid level sensors 418, 420, 422 are configured to send an alert to the control system 402 if the current level of the fragrance oils 409, 411, 415 falls below a threshold level (not shown). The control system 402 further sends the alert to the wireless transceiver 434 of the user. It should be noted that the user may customize the threshold level of the fragrance oils 409, 411, 415.

The threshold level may be considered as the level of the fragrance oils 409, 411, 415 in the atomizer devices 413, 414, 416 below which siphoning process fails to execute. Examples of the fluid level sensors 418, 420, 422 include, but are not limited to, fuel gauge of the car, float switch, image-based sensor, optical sensor etc.

In an embodiment, the fluid level sensors 418, 420, 422 intermittently send electrical signal to the electronic control system 402 representing fluid level in the respective atomizer devices 413, 414, 416. The electrical signal is received by the electronic control system 402 via an electrical interface of the electronic control system 402. Upon receipt of the electric signals, readings of the fluid level are converted into the wireless signal 434a by the electronic control system 402. The wireless signal 434a is further sent to the wireless transceiver 434 of the user to intimate or notify to the user if there is a need to refill the atomizer devices 413, 414, 416.

Figure 4:
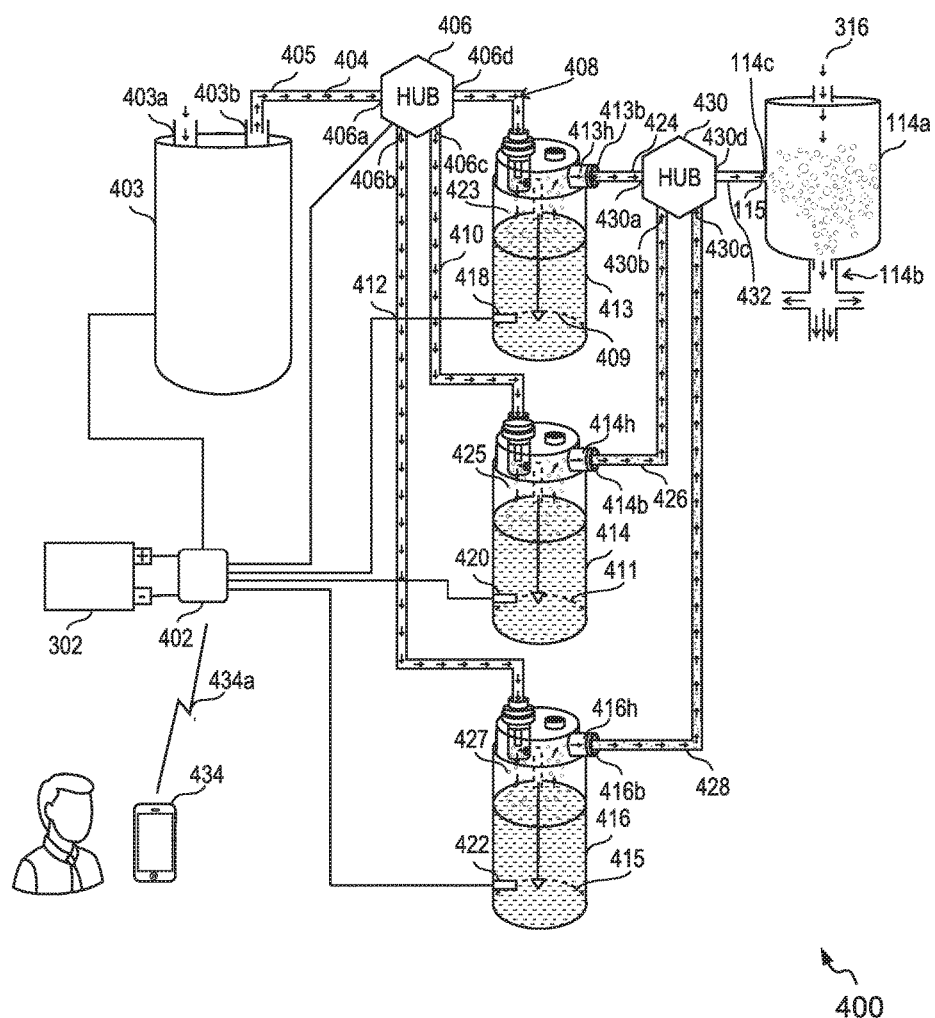
FIG. 4 illustrates a schematic representation of the air fragrance diffuser system for use in an automobile, in accordance with another example embodiment of the present disclosure.

In the illustrated embodiment of FIG. 4, the outlet ports 413b, 414b, 416b of the atomizer devices 413, 414, 416 are pneumatically and fluidically coupled to air delivery conduits 424, 426, 428, respectively. Each of the outlet ports 413b, 414b, 416b is configured to provide transmission of the fragrance mist 423, 425, 427 into respective delivery conduits 424, 426, 428.

The air delivery conduits 424, 426, 428 are configured to provide transmission of the fragrance mist 423, 425, 427 into the valve hub 430 through multiple inlets 430a-430c. The air delivery conduits 424, 426, 428 are pneumatically and fluidically coupled to the inlets 430a-430c of the valve hub 430. An outlet 430d of the valve hub 430 is pneumatically and fluidically coupled to the transmission system 115.

In an embodiment, the transmission system 115 includes an air delivery conduit 432. The outlet of the air delivery conduit 432 is pneumatically and fluidically connected to the HVAC ventilation chamber 114a of the existing HVAC system 114 of the automobile 100. The transmission system 115 is configured to supply the fragrance mist 423, 425, 427 into the passenger compartment 125 using the vents of the existing HVAC system 114 of the automobile 100. As explained in FIG. 3, the HVAC ventilation chamber 114a and the HVAC ventilation lines are configured to supply the fragrance mist 423, 425, 427 into the automobile cabin 125 via HVAC vents.

Figure 5:
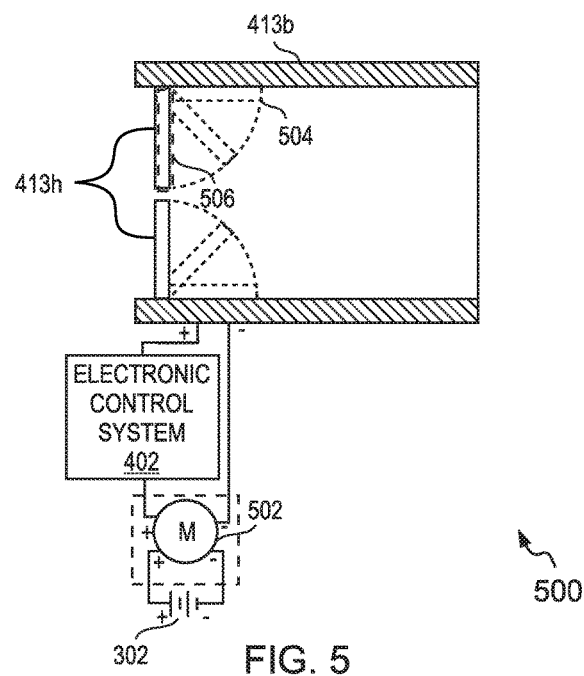
FIG. 5 illustrates a cross-sectional view of an outlet port of the atomizer device of FIG. 1, in accordance with an example embodiment of the present disclosure.

FIG. 5 illustrates a cross-sectional view 500 of the outlet port of the atomizer device of FIG. 4, in accordance with an example embodiment of the present disclosure. In this illustrated example, the cross-sectional view of the outlet port 413b of the atomizer device 413 is shown, where the outlet port 413b exemplarily includes the baffle disk 413h.

In one form, the baffle disk 413h (or 414h, 416h) is a hollow circular disc disposed in between inner periphery of the outlet port 413b (or 414b, 416b) in a co-axial manner, and movement of the baffle disk 413h between a horizontal position 504 (i.e. an open position) and a vertical position 506 (i.e. a closed position) is precisely controlled by the electronic control system 402 by supplying variable electric current to its step-up motor 502 which is operatively coupled to the baffle disk 413h for providing angular actuation (or movement) to the baffle disk 413h. The step-up motor 502 having a shaft (not shown) is operatively coupled to the baffle disk 413h to provide the movement between the horizontal position 504 and the vertical position 506.

In an embodiment, the other baffle disks 414h, 416h of the outlet ports 414b, 416b are also operatively coupled to the step-up motor (not shown) to provide angular movement for providing variation in the intensity of the vapors of the fragrance mist 425, 427. The baffle disks 413h, 414h, 416h, through suitable operation, are configured to offer variation in volume of the fragrance mist 423, 425, 427. The variation in the volume of the fragrance mist 423, 425, 427 is achieved by either blocking or allowing the vapors by the baffle disks 413h, 414h, 416h during discharge of the fragrance mist.

The positions of the baffle disks 413h, 414h or 416h can be controlled by control signals (e.g., the wireless signal 434a) received by the user through the wireless transceiver 434. For instance, upon receiving the wireless signal 434a, the electronic control system 402 supplies appropriate electrical signal to the step-up motor associated with each of the baffle disks 413h, 414h, 416h for controlling the angular movement of the baffle disks 413h, 414h, 416h. Hence, each of the baffle disks 413h, 414h, 416h may attain a desired position ranging from the open position to the closed position to allow a controlled flow of fragrance mist therefrom.

In an embodiment, the baffle disks 413h, 414h, 416h swing back to their vertical position 506 only when the fragrance diffuser system 400 is turned off or the air pump 403 is switched off to restrain the vapors from leaving the atomizer devices 413, 414, 416. The baffle disks 413h, 414h, 416h swing to the horizontal position 504 as default position. The horizontal position 504 simply acts as if "no" baffle disk is present inside the outlet ports 413b, 414b, 416b.

The angular movement from the horizontal position 504 to the vertical position 506 decreases the amount of fragrance mist that can flow into the transmission system 115 and vice-versa. Any intermediate angular position of the baffle disk 413h in between the vertical position 506 and the horizontal position 504 depends upon the selection by the user to increase or decrease the intensity of the fragrance mist 423. For instance, the user may send the wireless signal 434a through the wireless transceiver 434 for a desired intensity of fragrance, which is achieved by letting the baffle disks 413h, 414h, 416h achieve appropriate angular positions. The electronic control system 402 receives the wireless signal 434a through the communication module present in the control system 402, interprets and converts the wireless signal 434a into an electrical signal and further provides the electric signal to the input of the step-up motor 502 of the baffle disks 413h, 414h, 416h for the desired intermediate position between the horizontal position 504 and the vertical position 506 of the baffle disks 413h, 414h, 416h.

Figure 6:
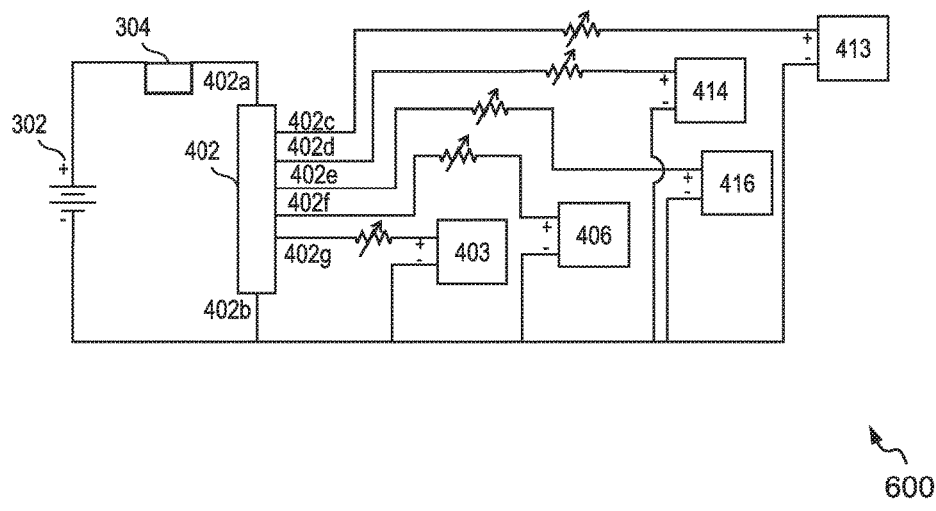
FIG. 6 illustrates an electronic circuit diagram of the air fragrance diffuser system of FIG. 4, in accordance with an example embodiment of the present disclosure.

FIG. 6 illustrates an electronic circuit diagram 600 of the fragrance diffuser system 400 of FIG. 4, in accordance with an example embodiment of the present disclosure. The electronic circuit diagram 600 of the fragrance diffuser system 400 represents electrical connections associated with the battery 302, the fuse box 304, the electronic control system 402, the air pump 403, the electronic valve hub 406, and the atomizer devices 413, 414 and 416.

The electronic control system 402, through input terminal 402a, 402b, is electrically coupled to the battery 302, and through multiple output terminals 402c-402g supplies control signals to other components described herein. The output terminals 402c-402g are electrically connected to the air pump 403, the valve hub 406 and the atomizer devices 413, 414, 416. The electrical power supplied to the atomizer devices 413, 414, 416 is further divided and fed to the fluid level sensors 418, 420, 422 and the baffle disks 413h, 414h, 416h.

In at least one example embodiment, the electronic control circuit 306 is configured to provision the power supply from the battery 302 to the air pump 403 only when a HVAC system (not shown) is powered ON, and the power supply to the air pump 403 is disconnected when the HVAC system is powered OFF. Further, the electronic control system 402 is configured to control the compression caused in the air pump 403 which in turn controls the rate of generation of vapors in the atomizer devices 413, 414, 416.

In at least one example embodiment, the electronic control system 402 provisions power supply to the air pump 403 intermittently to reduce working duration of the air pump 403, consequently, reducing the rate of generation of the vapors in each of the atomizer devices 413, 414, 416. Such intermittent operation of the air pump 403 helps in controlling the intensity of the vapors in the fragrance mist 423, 425 and 427.

Figure 7:
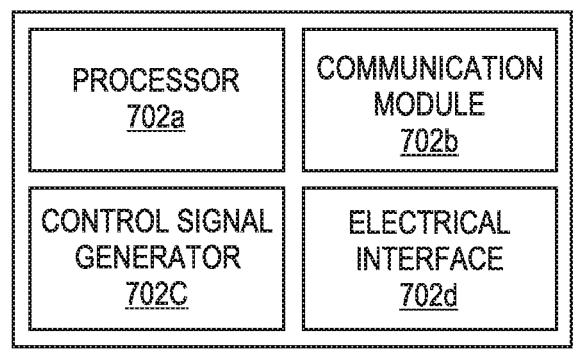
FIG. 7 represents a block diagram of an electronic circuit diagram of FIG. 4, in accordance with an example embodiment of the present disclosure.

FIG. 7 represents a block diagram of the electronic control system 402 of the fragrance diffuser system 400 of FIG. 4, in accordance with an example embodiment of the present disclosure.

The electronic control system 402 includes a processor 702a, a communication module 702b, a control signal generator 702c and an electrical interface 702d. The electronic control system 402 provides different control signals to components (e.g., 403, 406, 413, 414, and 416) which are electrically connected to the electronic control system 402.

In an example, the communication module 702b is a Bluetooth module. Alternatively, the communication module 702b can be wireless module such as GSM module, Infrared or any near-field communication module. The communication module 402b receives the wireless signal 434a sent by the user through the wireless transceiver 434. The communication module 702b works in communication with the processor 702a, which is the main part of the electronic control system 402. The processor 702a may be a multiprocessor or a microcontroller. The processor 702a is configured to execute program instructions and can read and interpret the wireless signal 434a. The processor 702a, in response to the interpreted wireless signal 434a, coordinates with the control signal generator 702c to generate various control signals for components (e.g., 403, 406, 413, 414, and 416). The electrical interface 702d is configured to provide the control signals to the components by means of wired or any other suitable interface.

Figure 8:
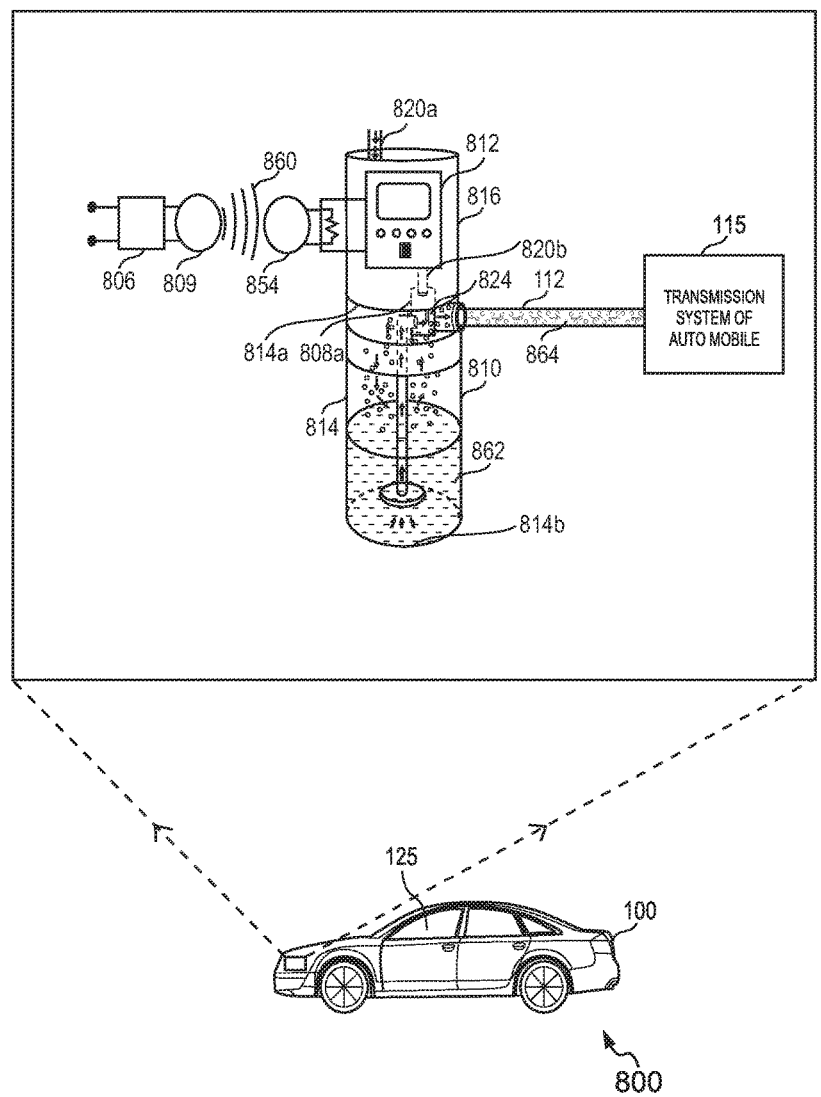
FIG. 8 illustrates a simplified schematic representation of an air fragrance diffuser system for an automobile, in accordance with another example embodiment of the present disclosure.

FIG. 8 is a simplified schematic representation of an air fragrance diffuser system 800, illustrating an air pressure generating source 816 integrated within an atomizer device 810 according to another embodiment of the present disclosure.

Figure 9:
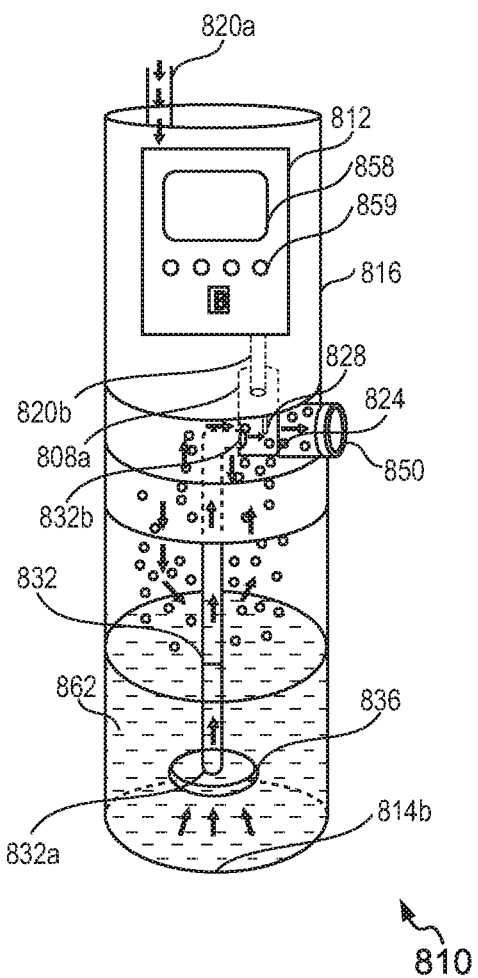
FIG. 9 illustrates a schematic representation of an atomizer device, illustrating the air pump integrated on top surface of the atomizer device of the air fragrance diffuser system of FIG. 8, in accordance with an example embodiment of the present disclosure.
Figure 10:
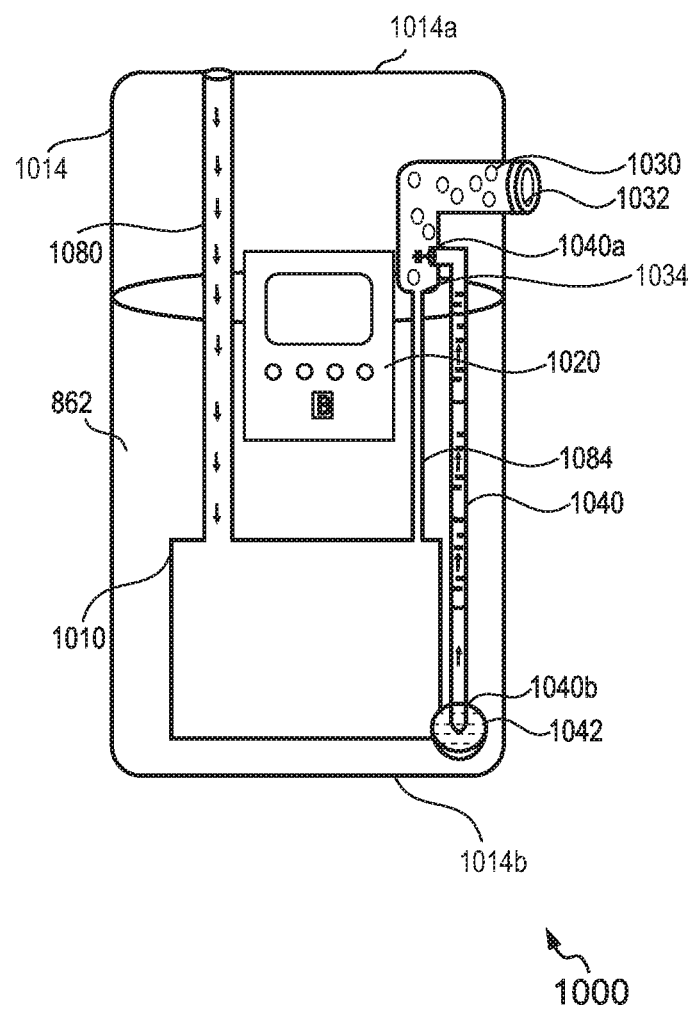
FIG. 10 illustrates a schematic representation of an atomizer device, illustrating the air pump integrated on a bottom surface of the atomizer device of air submersible fragrance diffuser system of FIG. 8, in accordance with another example embodiment of the present disclosure.

Referring FIG. 9 in conjunction with FIG. 8, the air fragrance diffuser system 800 comprises the atomizer device 810 including a sealed enclosed chamber 814 for storing a fragrance oil 862. The sealed enclosed chamber 814 may be coupled to the air pressure generating source 816 such that, an inlet port 808a of the atomizer device 810 is coupled to an outlet port (not shown in FIG.) of the air pressure generating source 816 for receiving the pressurized air. This configuration ensures that the pressurized air is routed to the sealed enclosed chamber 814. In an embodiment, the air pressure generating source 816 may be integrated within the atomizer device 810 by mounting the air pressure generating source 816 on a top surface 814a of the atomizer device 810.

A housing 824 is mounted below the inlet port 808a and is coupled to a siphon tube 832 for receiving fragrance oil 862 from the sealed enclosed chamber 814. The siphon tube 832 includes an inlet end 832a located proximal to a bottom surface 814b of the sealed enclosed container 814 and an outlet end 832b coupled to the housing 824. The siphon tube 832 is configured to draw in the fragrance oil 862 via the inlet end 832a and transport the fragrance oil 862 from the sealed enclosed chamber 814 to the housing 824 via the outlet end 832b. The housing 824 includes at least one aperture (not shown in Figures) configured along the circumference of the housing 824, so that the fragrance oil 862 routed to the housing 824 interacts with the pressurized air to form vapors. The vapors along with the air collectively referred to as the fragrance mist 864 is routed to a transmission system 115 from the housing 824 via an air delivery conduit 112. The transmission system 115 is configured to transmit the fragrance mist 113 into the automobile cabin 125 (also referred to as 'a passenger compartment') through the HVAC system 114 of the automobile 100 (as already described in FIG. 3). Alternatively, the transmission system 115 may directly blow the fragrance mist 864 into the cabin 125 with or without using a separate fan or blower.

Further, the air fragrance diffuser system 800 also includes an electronic control system 812 associated with the air pressure generating source 816, the atomizer device 810 and the user as already described. The electronic control system 812 is configured to control operation of the air pressure generating source 816 and notify the user the level of the fragrance oil 862 within the sealed enclosed chamber 814.

Referring back to FIG. 8, the air fragrance diffuser system 800 also includes a power source 806 associated with the air pressure generating source 816 for supplying power to the air pressure generating source 816. The power source 806 may also be located outside of the atomizer device 810 and may be associated with the air pressure generating system 816 wirelessly. For facilitating wireless power transfer between the power source 806 and the air pressure generating source 816, a wireless transceiver unit 854 may be mounted on the air pressure generating source 816. The wireless transceiver unit 854 may be configured with a receiver unit (for e.g. shown in FIG. 12) for wirelessly receiving power from the power source 806 via a wireless power signal 860. The wireless transceiver unit 854 may also include a transmitter unit 1136b (for e.g. shown in FIG. 12) for transferring the received power to the air pressure generating source 816. The wireless transceiver unit 854 may be interfaced with the electronic control system 812, so that the electronic control system 812 may control the operations of the wireless transceiver unit 854. Additionally, the power source 806 when located exterior to the atomizer device 810 may include at least one of an amplifier, a transmitter 809 (for e.g. shown in FIG. 12) or any other means required for facilitating wireless transfer of power from the power source 806 to the wireless transceiver unit 854.

Figure 11:
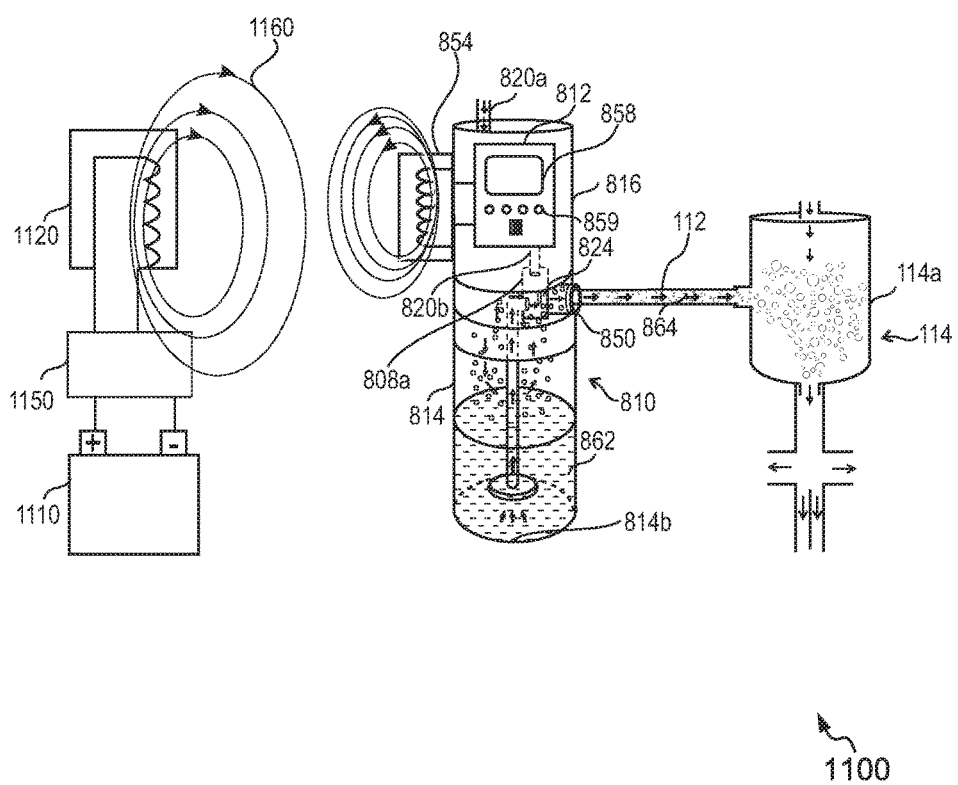
FIG. 11 illustrates a schematic representation of the air fragrance diffuser system for use in an automobile, in accordance with an example embodiment of the present disclosure.

Further referring to FIG. 11 in conjunction with FIG. 8 illustrates an embodiment of the power source 806 as a power source 1110 interfaced to the air pressure generating source 816. The power source 1110 is located external to the atomizer device 810 and may be selected to be an inductive type wireless power transfer device. The inductive type wireless power transfer device may include at least one coil 1120 coupled to a power source 1110. Upon receiving alternating current from the power source 1110, the at least one coil 1120 may get energized and consequently generate a magnetic field 1160. The magnetic field 1160 interacts with the wireless transceiver unit 854, which may include at least one receiver coil 1136a as the receiver unit. The magnetic field 1160 upon interaction with the at least one receiver coil 1136a induces a voltage in the receiver coil 1136 which would be transmitted to the transmitter unit 1136b. The transmitter unit 1136b transfers the voltage to the air pressure generating source 816 suitably.

In an embodiment, suitable electrical devices such as but not limiting to an oscillator 1150 (also illustrated in FIG. 12), rectifiers, amplifiers or any other devices may be incorporated to either of the power source 806, 1110 and the wireless transceiver unit 854 for optimum wireless power transmission there between.

In another embodiment, a suitable dielectric medium may be provided between the power source 806 and the wireless transceiver unit 854 for optimum wireless power transmission. In another embodiment, the distance between the power source 806 and the wireless transceiver unit 854 is adjustable for optimum wireless power transmission.

In an embodiment, the number of turns in the at least one coil 1120 and the at least one receiver coil 1136 may be selected based on the power transfer requirement.

Figure 12:
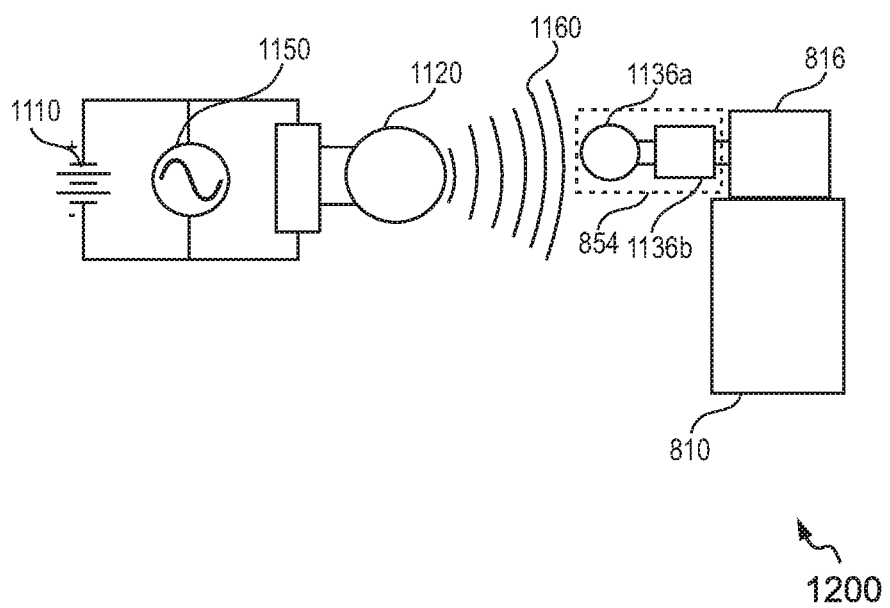
FIG. 12 illustrates an electronic circuit diagram of the air fragrance diffuser system for use in an automobile, in accordance with an example embodiment of the present disclosure.

Furthermore, referring to FIG. 12 in conjunction to FIG. 8, the direct current from a power source 1110 such as a battery, may be transferred wirelessly to the wireless transceiver unit 854. For transferring the direct current from the power source 1110 an oscillator 1150 or any other suitable electric device for converting direct current to the alternating current is employed. The direct current once routed to the oscillator 1150, converts the direct current to the alternating current. The alternating current when routed through the at least one coil 1120 generates the magnetic field. The magnetic field upon interaction with the at least one receiver coil 1136 of the wireless transceiver unit 854 induces the voltage therein, which will be supplied to the air pressure generating source 816.

In an embodiment, the power source 1110 may be interfaced with the electronic control system 812. The electronic control system 812 in-turn may be associated with the HVAC system 114, so that the electronic control system 812 may operate the power source 1110 corresponding to the operational state of the HVAC system 114. That is, the electronic control system 812 may allow power supply from the power source 1110 to the air pump 816 when the HVAC system 114 is powered ON and switch OFF the power supply from the power source 1110 to the atomizer device 810 when the HVAC system 114 is powered OFF.

In an embodiment, the atomizer device 810 may also include a capacitor (not shown in Figures) for storing power received by the wireless transceiver unit 854, so that stored power may act as a back-up in the event of fluctuations in the power received from the power source 1110.

In an embodiment, multiple power sources 806, 1110 may be connected in tandem for ensuring optimum supply of power to the air pressure generating source 816.

In another embodiment, the wireless power transmission may also be achieved by Magneto dynamic coupling (not shown in Figures). The magneto dynamic coupling may include a first magnet positioned proximal at least one coil 1120. Upon supply of power to the at least one coil 1120, the first magnet may rotate corresponding to the magnetic field generated therein. Correspondingly the first magnet may be associated with a second magnet located proximal to the at least one receiver coil 1136, wherein the second magnet also rotates in a direction corresponding to the direction of the first magnet. The rotation of the second magnet induces the voltage in the at least one receiver coil 1136 which may be supplied to the air pressure generating source 816.

In an embodiment, the power source 1110 may transfer power wirelessly to the air pressure generating source 816 by interaction of electromagnetic waves there between. In an embodiment, the electromagnetic waves may be one of radio waves, ultra-violet rays, micro waves, infrared waves or any other electromagnetic waves as per feasibility and requirement. In an embodiment, the power source 1110 may transfer power wirelessly to the air pressure generating source 816 by one of a resonant inductive coupling, an ultrasonic power transmission, an infrared waves power transmission, a radio frequency waves power transmission or any other means as per design feasibility and requirement. In an embodiment, the power source 1110 may incorporate one or more means for optimum wireless transmission of power to the air pressure generating source 816.

In an exemplary embodiment, the power source 1110 may be one of solar panels (not shown in Figures) mounted on any exterior surface of the automobile, a battery or any other source which serves the requirement.

In an embodiment, the electronic control system 812 further includes a display panel 858 for displaying the current working specification and may include buttons 859 for altering current working specification. The working specification shown in the display including, but not limited to the fuel level, air pump 816 compression ratio, CFM, and efficiency.

In an embodiment, a filter 836 may be configured at the inlet end 832*a* of the siphon tube 832 for filtering debris or dirt in the fragrance oil 862, prior to transfer into the housing 824.

In an embodiment, the housing 824 may include a jet orifice 828 (for e.g. as shown in FIG. 9) configured to discharge the pressurized air received through the inlet port 808*a* is discharged out of the jet orifice 828 at a higher speed, for ensuring higher atomization rates of the fragrance oil 862.

In an embodiment, the air pressure generating source 816 receives atmospheric air through an inlet port 820*a*. The atmospheric air 816 is compressed within the air pressure generating source 816 for producing the pressurized air.

In an embodiment, the air pressure generating source 816 is integrated to the top surface 814*a* (for e.g. as shown in FIG. 9) of the sealed enclosed chamber by means such as a threaded attachment, a snap-fitted attachment or any other means as per feasibility and requirement.

In an embodiment, the air pressure generating source 816 may be compact. The configuration of the air pressure generating source 816 may be similar to the configuration of the sealed enclosed chamber 814 of the atomizer device 810. Without loss of generality, the shape of the air pressure generating source 816 may be such as, but limited to a toroidal shape, a cylindrical shape or any other geometrical shape as per design feasibility and requirement.

In an embodiment, the configuration of the atomizer device 810 may also include a cover member (not shown in FIGS.) secured on the top surface 814*a* of the sealed enclosed chamber 814. The cover member may be detached from the sealed enclosed chamber 814 for refilling the fragrance oil 862 within the sealed enclosed chamber 814. In an embodiment, the cover member may be secured to the top surface 814*a* by means such as but not limited to a threaded attachment, a snap-fitted attachment or any other means as per feasibility and requirement.

In an embodiment, the air pressure generating source 816 maybe a compressor or an air pump for pressurizing the atmospheric air into pressurized air. In an embodiment, the air pressure generating source 816 maybe one of a screw air pump, a rotary lobe air pump, a piston pump, a vane air pump or any other pump which serves the purpose.

FIG. 10 is a schematic representation of an air fragrance diffuser system 1000, illustrating an air pressure generating source 1010 positioned proximal to a bottom surface 1014*b* of a sealed enclosed container 1014 of an atomizer device 1010, in accordance with another example embodiment of the present disclosure. As the air pressure generating source 1010 is positioned proximal to the bottom surface 1014*b* of the sealed enclosed chamber 1014, the air pressure generating source 1010 may be submerged within the fragrance oil 862 to act as a submersible air pump. In an embodiment, the air pressure generating source 1010 may be positioned at any location within the atomizer device 1010 as per feasibility and requirement. The air pressure generating source 1010 includes an inlet port 1080 which may extend from a top surface 1014a of the sealed enclosed container 1014 for receiving the atmospheric air. The atmospheric air is compressed within the air pressure generating source 1010 to generate the pressurized air. The pressurized air is routed to a housing 1030 via an outlet port 1084. The housing 1030 which may be an inverted L-shaped hollow tube structure, is located at the junction of the air pressure generating source 1010 and the sealed enclosed chamber 1014, for converting the fragrance oil 862 into the vapors. The housing 1030 includes a bottom open end 1034 (or inlet) coupled to the outlet port 1084 and the top open end (or outlet) 1032 protruding outwardly from the atomizer device 1000.

Additionally, the housing 1030 includes a jet orifice (not shown in FIG. 10) and at least one aperture (not shown in FIGS.), so that the pressurized air received through the outlet port 1084 can pass through the jet orifice at a higher speed and the at least one aperture. The pressurized air when passed through the jet orifice and the at least one aperture reduces pressure level of the pressurized air. The housing 1030 is also connected to the sealed enclosed chamber 1014 via a siphon tube 1040 for receiving the fragrance oil 862. The siphon tube 1040 is a hollow cylindrical tube having a bottom open end (or inlet) 1040b and a top open end (or outlet) 1040a positioned within the housing 1030 such that the outlet 1040b is juxtaposed to the jet orifice for allowing the drawn fragrance oil 862 to interact with the air emanated from the jet orifice. The siphon tube 1040 is configured to draw the fragrance oil 862 from the sealed enclosed chamber 1014 via the bottom open end 1040b and transfer the fragrance oil 862 to the housing 1030 via the outlet 1040a due to the pressure difference created in the housing 1030. The fragrance oil 862 upon interaction with the air in the housing 1030, is converted into vapors which may be routed to the passenger compartment (not shown in Figures) via an air delivery conduit (not shown in the figures) or a transmission system (not shown in the figures) coupled to the outlet 1032 of the housing 1030.

Further, as the air pressure generating source 1014 is submerged in the atomizer device 1000, elevation between the air pressure generating source 1014 and the fragrance oil 862 is reduced, thereby eliminating requirement of higher pumping pressures and improving pumping efficiency. Moreover, due to the submerged configuration of the air pressure generating source 1010 the components extending from the air pressure generating source 1010 are assembled within the sealed enclosed chamber 1014 and thus, compacting the air fragrance diffuser system 1000.

In an embodiment, the inlet 1040b of the siphon tube 1040 includes a filter 1042 for filtering debris or other foreign particles dispersed in the fragrance oil 862. In an embodiment, the filter 1042 may be a circular mesh filter or any other filter which serves the purpose.

Figure 13:
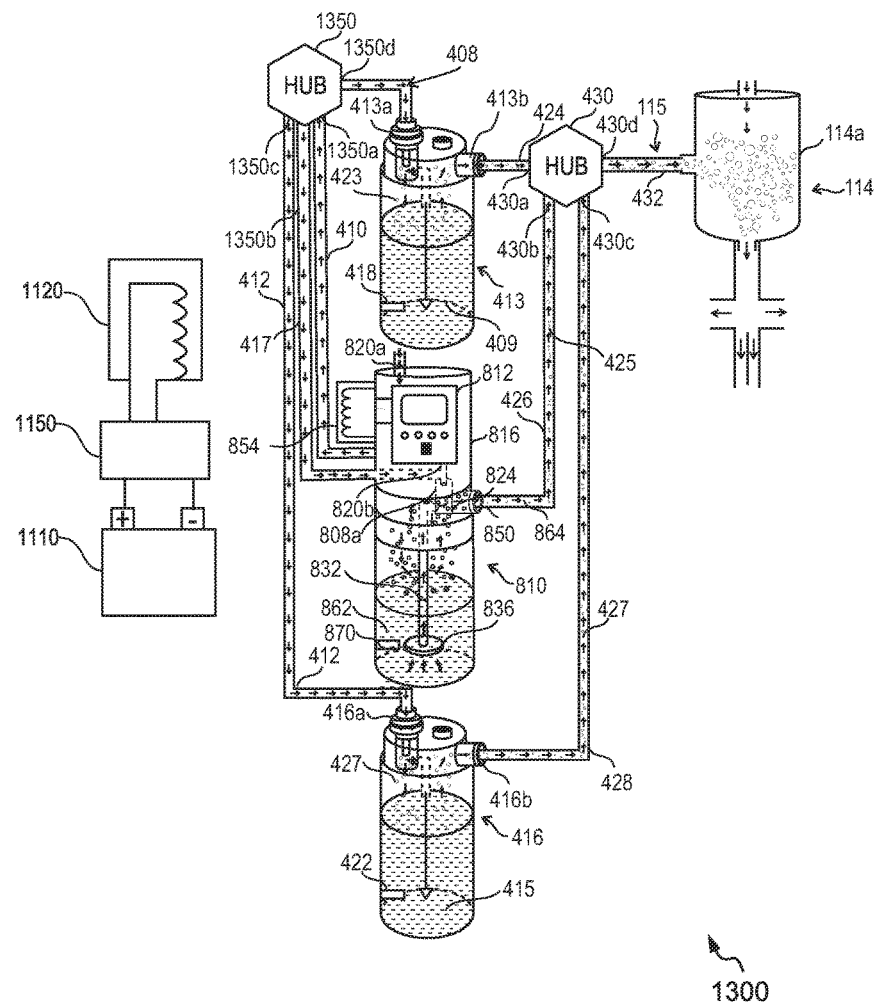
FIG. 13 illustrates a schematic representation of the air fragrance diffuser system for use in an automobile, in accordance with another example embodiment of the present disclosure.

FIG. 13 is a simplified schematic representation of a fragrance diffuser system 1300 illustrating cascaded arrangement of a plurality of atomizer devices, in accordance with another example embodiment of the present disclosure. The plurality of atomizer devices may include a first atomizer device 413, a second atomizer device 810 and a third atomizer device 416 interconnected with each other. Each of the plurality of atomizer devices are configured to store dissimilar fragrance oils 409, 862, 415 so that the user may experience different aroma during use. In the present embodiment, the atomizer device 414 of FIG. 4 is replaced by the second atomizer device 810 of FIG. 8 which has an integrated air pump 816. The air pump 816 pneumatically couples with each of the first atomizer device 413, the second atomizer device 810 and the third atomizer device 416 for supplying the pressurized air. Further, as the atomizer device 810 is integrated with the air pump 816 and includes the electronic control system 812, the second atomizer device 810 acts as a master configuration. The first atomizer device 413 and the third atomizer device 416 connected to the atomizer device 810 acts as a slave configuration to the atomizer device 810, due to their dependency on the atomizer device 810.

Further, the air pump 816 integrated within the second atomizer device 810 comprises the inlet port 820a configured to receive atmospheric air. The air pump 816 compresses the atmospheric air to produce the pressurized air as already described in FIG. 8. The pressurized air is discharged from the air pump 816 via an outlet port (not shown in FIG.) which further connects to inlet ports 413a, 416a of the first atomizer device 413 and the third atomizer device 416 for delivering pressurized air respectively via a first electronic valve hub 1350. The first electronic valve hub 1350 may comprise an inlet 1350a and a plurality of outlets 1350b and 1350c, wherein the outlets 1350b-1350d are connected to the second air delivery conduit 417, the third air delivery conduit 412 and the first air delivery conduit 408 respectively, for routing pressurized air. Each of the outlets of the first air delivery conduit 408, the second air delivery conduit 417 and the third air delivery conduit 412 is pneumatically coupled to each of the inlet 413a, 808a, 416a of the first atomizer device 413, the second atomizer device 810 and the third atomizer device 416 for providing the pressurized air. The first electronic valve hub 1350 is also interfaced with the electronic control system 812 for selectively routing the pressurized air into the each of the first atomizer device 413, the second atomizer device 810 and the third atomizer device 416.

Further, each of the first atomizer device 413, the second atomizer device 810 and the third atomizer device 416 include outlet ports 413b, 850, 416b respectively, and are coupled to air delivery conduits 424, 426, 428. Each of the outlet ports 413b, 850, 416b is configured to facilitate transmission of the fragrance mist 423, 864, 427 generated within each of the first atomizer device 413, the second atomizer device 810 and the third atomizer device 416 into the respective air delivery conduits 424, 426, 428. The air delivery conduits 424, 426, 428 are further configured to route the fragrance mist 423, 864, 427 into a second electronic valve hub 430. The second electronic valve hub 430 includes a plurality of inlets 430a-430c and an outlet 430d. Each of the plurality of inlets 430a-430c is pneumatically and fluidically coupled to each of the outlet ports 413b, 850, 416b of each of the first atomizer device 413, the second atomizer device 810 and the third atomizer device 416 for routing the fragrance mist 423, 864, 427. The outlet 430d of the second electronic valve hub 430 is pneumatically and fluidically coupled to the transmission system 115 for routing the fragrance mist 423, 864, 427. The transmission system 115 includes an air delivery conduit 432, which connects to the HVAC ventilation chamber 114a of the HVAC system 114 of the automobile 100, for routing the fragrance mist 423, 864, 427 into the passenger compartment 125 as already described.

Additionally, the air fragrance diffuser system 1300 includes the power source 1110 which may be located exterior to each of the first atomizer device 413, the second atomizer device 810 and the third atomizer device 416 and may transfer power wirelessly to the air pump 816 as described with reference to FIG. 8.

In operational embodiment of the air fragrance diffuser system 1300, upon noticing powered ON condition of the HVAC system 114 or upon receiving input from the user, the electronic control system 812 activates the power source 1110 for wireless transfer of power to the air pump 816 via the wireless transceiver unit 854. The air pump 816 upon receiving power generates the pressurized air. The generated pressurized air is selectively routed between each of the first atomizer device 413, the second atomizer device 810 and the third atomizer device 416 based on the input received from the user. That is, if the user is in requirement to experience the aroma from the second atomizer device 810, the electronic control system 812 routes the pressurized air into the second atomizer device 810 for producing the fragrance mist 864, which is subsequently routed to the passenger compartment 125 for user experience.

Similarly, if the user is in requirement to experience the fragrance from the first atomizer device 413, the electronic control system 812, upon receiving the input routes the pressurized air to the first electronic valve hub 1350. The electronic control system 812 controls the first electronic valve hub 1350 such that, the pressurized air is routed to the air delivery conduit 408, so that the pressurized air is inlet into the first atomizer device 413 via the inlet port 413*a*, resulting in generation of the fragrance mist 423 therein. The fragrance mist 423 is subsequently routed to the passenger compartment 125 for user experience. The similar operation works for receiving the fragrance mist 427 from the third atomizer device 416.

In another embodiment, the user may also receive mixture of the fragrance mist 423, 864, 427, by selectively routing the pressurized air between each of the first atomizer device 413, the second atomizer device 810 and the third atomizer device 416 (as already described in FIG. 4).

In an embodiment, the air pump 816 may be integrated with any of the plurality of atomizer devices.

In an embodiment, the air pump 816 may be directly coupled to the second atomizer device 810 instead of the first electronic valve hub 1350. This configuration further mitigates the need for additional pipeline required for connecting the first electronic valve hub 1350 with the second atomizer device 810.

In an embodiment, the electronic second valve hub 1350 may be interfaced to the electronic control system 812, for controlling a valve position therein.

In an embodiment, each of the first atomizer device 413, the second atomizer device 810 and the third atomizer device 416 may be equipped with fluid level sensors 418, 870, 422 respectively. The fluid level sensors 418, 870, 422 are configured to determine the level of the fragrance oils 411, 862, 415 in the atomizer devices 413, 810, 416, respectively. The fluid level sensors 418, 870, 422 are configured to send an alert to the electronic control system 812, when the level of the fragrance oils 411, 862, 415 drops below a threshold level (not shown). The electronic control system 812 further sends the alert to the wireless transceiver 434 of the user. It should be noted that the user may customize the threshold level of the fragrance oils 411, 862, 415. The threshold level may be considered as the level of the fragrance oils 411, 862, 415 in the atomizer devices 413, 810, 416 below which siphoning process fails to execute.

Examples of the fluid level sensors 418, 870, 422 include, but are not limited to the float switch, the image-based sensor, optical sensor etc. In an embodiment, the fluid level sensors 418, 870, 422 may be positioned in the lower portion of the atomizer devices 413, 810, 416 for precise reading of the fragrance oil 411, 462, 415 therein.

In an embodiment, the fluid level sensors 418, 870, 422 may intermittently send electrical signal to the electronic control system 812 representing fluid level in the respective atomizer devices 413, 810, 416. The electrical signal is received by the electronic control system 812 via the electrical interface of the electronic control system 812. Upon receipt of the electric signals, readings of the fluid level are converted into the wireless signal 434*a* by the electronic control system 812. The wireless signal 434*a* is further transmitted to the wireless transceiver 434 of the user to notify the user for refilling the atomizer devices 413, 810, 416.

In an embodiment, the electronic control system 812 is communicably coupled with the wireless transceiver associated with the user. The user sends wireless signal to the electronic control system 812 for selectively choosing any one of the plurality of atomizer devices 413, 810, 416 for diffusing fragrance mist 423, 864, 427. In an embodiment, the electronic control system 812 controls the power supply to the air pump 816 for reducing working duration of the air pump 816, consequently, reducing the rate of generation of the vapors in each of the atomizer devices 413, 810, 416. This configuration facilitates intermittent operation of the air pump 816 and thus helps in controlling intensity of the vapors in the fragrance mist 423, 864, 427 formed therein.

In an embodiment, the outlet port 810*b* of the plurality of atomizer devices 413, 810, 416 may include the baffle disk disposed on the inner periphery of the output port 810*b* as already described in FIG. 5. In an embodiment, the one or more baffle disks are configured to swing between an open position and a closed position in response to a control signal received from the electronic control system 812.

In an embodiment, the wireless transceiver 434 can be any communication device or may be embodied in a user device including a phone, a computer, a personal digital assistant, a notebook, a laptop etc., which can send the wireless signal 434*a* as already described in FIG. 4. Without loss of generality, the wireless signal 434*a* maybe a Bluetooth signal or radio waves sent from the wireless transceiver 434.

Figure 14:
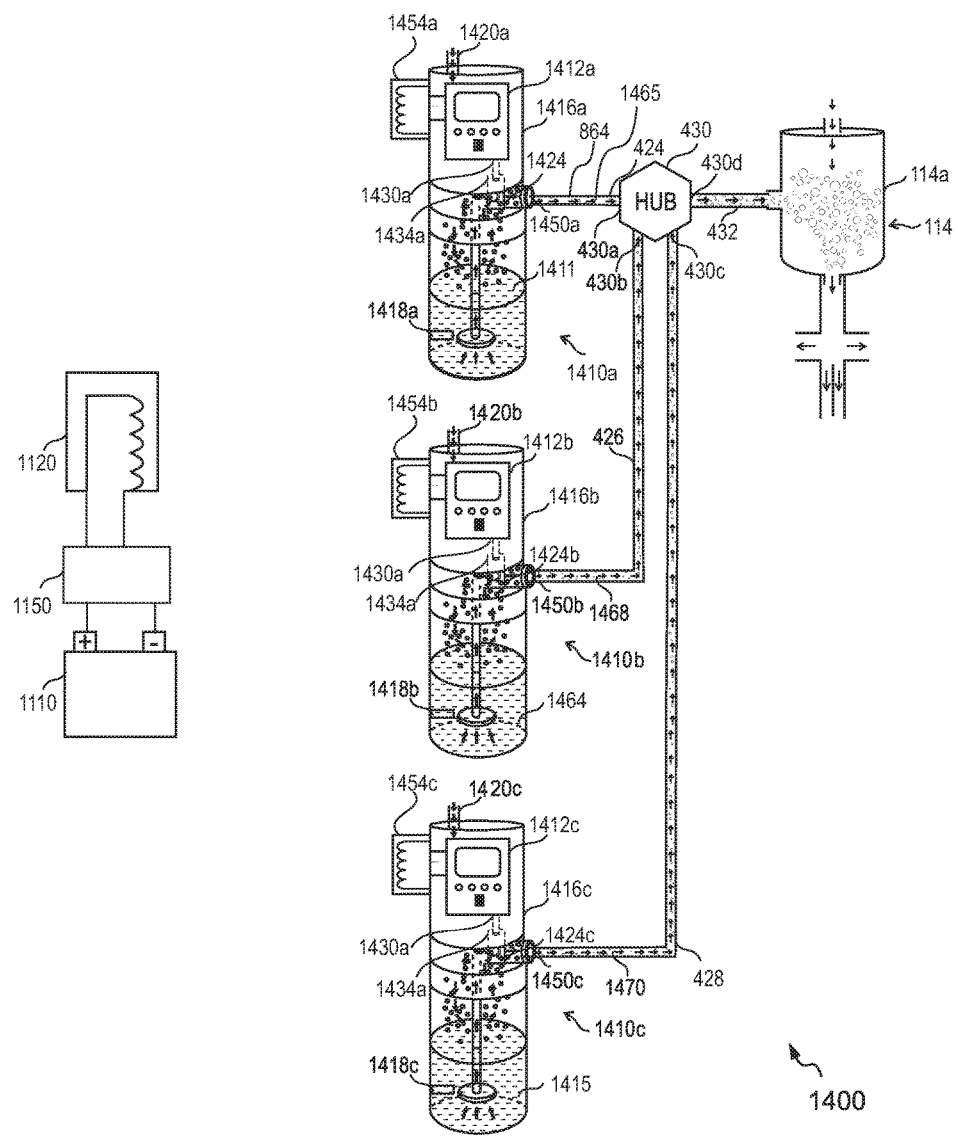
FIG. 14 illustrates an electronic circuit diagram of the air fragrance diffuser system for use in an automobile, in accordance with an example embodiment of the present disclosure.
Figure 15:
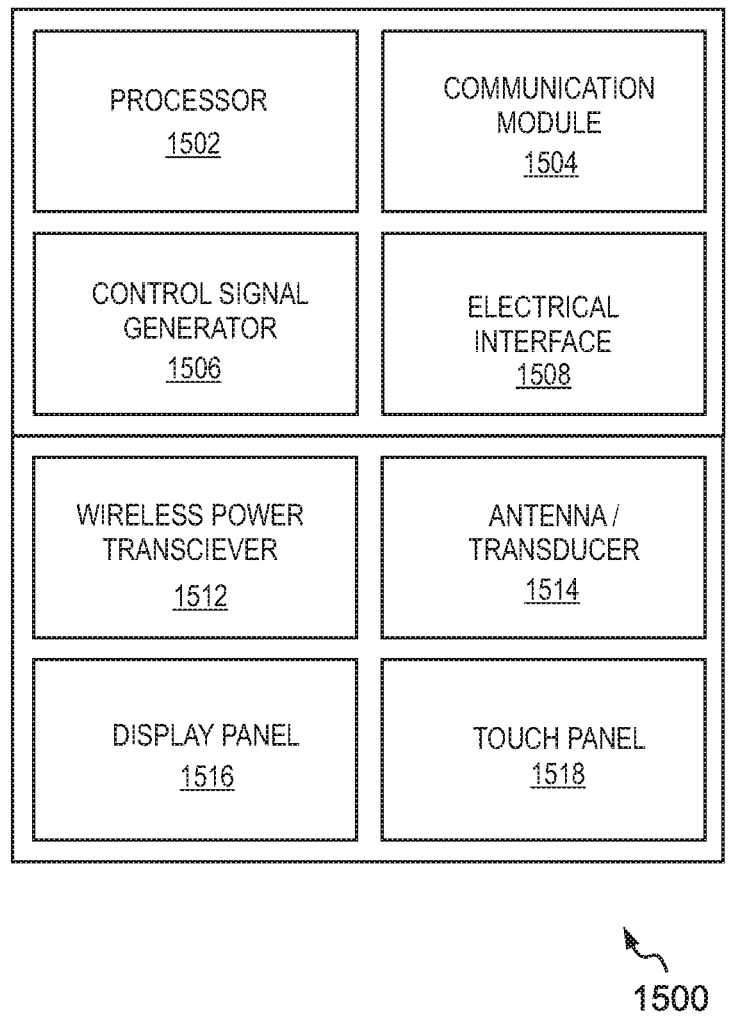
FIG. 15 represents a block diagram of an electronic control system of FIG. 11 and FIG. 13, in accordance with an example embodiment of the present disclosure.

FIG. 14 is a simplified schematic representation of a fragrance diffuser system 1400 illustrating cascaded arrangement of a plurality of atomizer devices, with each of the plurality of atomizer devices integrated with at least one air pump, in accordance with another example embodiment of the present disclosure. The plurality of atomizer devices may include a first atomizer device 1410*a* and a second atomizer device 1410*b* and a third atomizer device 1410*c* interconnected with each other. Each of the plurality of atomizer devices are configured to store dissimilar fragrance oils 1411, 1464 1415 so that the user may experience different aroma during use. Further, the at least one air pump may include a first air pump 1416*a*, a second air pump 1416*b* and a third air pump 1416*c*. The first air pump 1416*a*, the second air pump 1416*b* and the third air pump 1416*c* may be integrated within the first atomizer device 1410*a*, the second atomizer device 1410*b* and the third atomizer device 1410*c* respectively. Thus, the first air pump 1416*a* is configured to supply the pressurized air to the first atomizer device 1410*a*, the second air pump 1416*b* to the second atomizer device 1410*b* and the third air pump 1416*c* to the third atomizer device 1410*c*.

Further, the first air pump 1416*a*, the second air pump 1416*b* and the third air pump 1416*c* comprises an inlet port 1420*a*, 1420*b*, 1420*c* respectively, and are configured to receive atmospheric air. The first air pump 1416*a*, the second air pump 1416*b* and the third air pump 1416*c* compress the atmospheric air to produce the pressurized air as already described in FIG. 8. The pressurized air is routed from the first air pump 1416*a*, the second air pump 1416*b* and the third air pump 1416*c* via their respective outlet ports (not shown in FIG.) to inlet ports 1420*a*, 1420*b*, 1420*c* of the first atomizer device 1410*a*, the second atomizer device 1410*b* and the third atomizer device 1410*c* respectively. In the present embodiment, the first electronic valve hub 1350 (as shown in FIG. 13) may not be necessary as each of the atomizer devices include their own air pumps for receiving the pressurized air.

Further, each of the first atomizer device 1410*a*, the second atomizer device 1410*b* and the third atomizer device 1410*c* include outlet ports 1450*a*, 1450*b*, 1450*c* respectively, and are coupled to air delivery conduits 424, 426, 428. Each of the outlet ports 1450*a*, 1450*b*, 1450*c* is configured to facilitate transmission of the fragrance mist 863, 1468, and 1470 generated within each of the first atomizer device 1410*a*, the second atomizer device 1410*b* and the third atomizer device 1410*c* into the respective air delivery conduits 424, 426, 428. The air delivery conduits 424, 426, 428 are configured further route the fragrance mist 863, 1468, and 1470 into a valve hub 430. The valve hub includes a plurality of inlets 430*a*-430*c* and an outlet 430*d*. Each of the plurality of inlets 430*a*-430*c* is pneumatically and fluidically coupled to each of the output air delivery conduits 424, 426, 428 respectively, for receiving the fragrance mist 1465, 1468, and 1470. The outlet 430*d* is pneumatically and fluidly coupled to the transmission system 115 for routing the fragrance mist 1465, 1468, and 1470 into the passenger compartment 125 using the vents of the HVAC system 114 of the automobile 100.

Additionally, the air fragrance diffuser system 1400 includes the power source 1110 which may be located exterior to each of the first atomizer device 1410*a*, the second atomizer device 1410*b* and the third atomizer device 1410*c* and may transfer power wirelessly to each of the first air pump 1416*a*, the second air pump 1416*b* and the third air pump 1416*c* via as described in description of FIG. 8. For receiving power wirelessly from the power source 1110, wireless power transceiver units 1454*a*, 1454*b*, 1454*c* are associated with each of the first air pump 1416*a*, the second air pump 1416*b* and the third air pump 1416*c*.

Further, each of the plurality of atomizer devices 1410*a*, 1410*b*, 1410*c* include the electronic control system 1412*a*, 1412*b*, 1412*c* embedded to the outer surface of the plurality of the atomizer device. Each of the electronic control system 1412*a*, 1412*b*, 1412*c* is configured to control operation of the power source 1110 and the respective air pumps. The electronic control system 1412*a*, 1412*b*, 1412*c* is also communicably coupled with the wireless transceiver 434 associated with a user of the automobile 100. Also, each of the electronic control system 1412*a*, 1412*b*, 1412*c* are interfaced with wireless power transceiver units 1454*a*, 1454*b*, 1454*c* respectively, which are mounted on the first air pump 1416*a*, the second air pump 1416*b* and the third air pump 1416*c* respectively.

In operational embodiment of the air fragrance diffuser system 1400, upon noticing powered ON condition of the HVAC system 114 or upon receiving input from the user, at least one of the electronic control systems 1412*a*, 1412*b*, 1412*c* is activated. The activation of the electronic control system 1412*a*, 1412*b*, 1412*c* corresponds to the input received from the user as per his requirement. In other words, if the user requires activating the first atomizer device 1410*a*, then the electronic control system 1412*a* would be activated. Similarly, if the user requires activating either of the second atomizer device 1410*b* or the third atomizer device 1410*c*, then the electronic control system 1412*b* or 1412*c* would be activated. In an embodiment, multiple electronic control system 1412*a*, 1412*b*, 1412*c* may also be activated as per user's requirement.

Upon activation of at least one of the electronic control system 1412*a*, 1412*b*, 1412*c* say for e.g. the electronic control system 1412*a*, the power source 1110 is activated for wireless transfer of power to the first air pump 1416*a* via the wireless transceiver unit 1454*a*. The first air pump 1416*a* upon receiving power generates the pressurized air and is routed into the first atomizer device 1410*a* for producing the fragrance mist 1465 in the same manner as already described. The fragrance mist 1465 is routed to the valve hub 430 for routing into the passenger compartment 125 via the transmission system 115 for user experience.

Similarly, if the user is in requirement to experience the fragrance from the second atomizer device 1410*b*, the electronic control system 1412*b* is activated. The electronic control system 1412*b* activates the power source 1110 for wireless transfer of power to the second air pump 1416*b* via the wireless transceiver unit 1454*b*. The second air pump 1416*b* upon receiving power generates the pressurized air and is routed into the second atomizer device 1410*b* for producing the fragrance mist 1468 in the same manner as already described. The fragrance mist 1468 is routed to the valve hub 430 for routing into the passenger compartment 125 via the transmission system 115 for user experience. The same procedure is iterated for activating the third atomizer device 1410*c*.

In another embodiment, the user may also receive mixture of the fragrance mist 1465, 1468, 1470 by selectively activating the electronic control system 1412*a*, 1412*b*, 1412*c*, which activates the corresponding wireless transceiver unit for activation of the respective atomizer device (as already described in FIG. 4).

In an embodiment, each of the first atomizer device 1410*a*, the second atomizer device 1410*b* and the third atomizer device 1410*c* may be equipped with fluid level sensors 1418*a*, 1418*b*, 1418*c* respectively, and may operate similarly to the fluid level sensors 418, 870, 422 described in FIG. 13.

In an embodiment, if multiple power sources 1110 are available, each of the power sources 1110 may be within each of the first atomizer device 1410*a*, the second atomizer device 1410*b* and the third atomizer device 1410*c* and may further be interfaced with the first air pump 1416*a*, the second air pump 1416*b* and the third air pump 1416*c* for transferring of power.

In the present embodiment of the air fragrance diffuser device 1400, the embodiments described for other Figures, may apply suitably without affecting scope of the present embodiment.

FIG. 15 represents a block diagram of an electronic control system 1500 of FIG. 11, FIG. 13 and FIG. 14, in accordance with an example embodiment of the present disclosure.

The electronic control system 1500 includes a processor 1502, a communication module 1504, a control signal generator 1506 and an electrical interface 1508. The electronic control system 1500 provides different control signals to components (e.g., 403, 406, 413, 414, and 416) which are electrically connected to the electronic control system 402.

In an example, the communication module 1504 is a Bluetooth module. Alternatively, the communication module 1504 can be wireless module such as GSM module, Infrared or any near-field communication module. The communication module 1504 receives the wireless signal 1504 sent by the user through the wireless transceiver 434. The communication module 1504 works in communication with the processor 1502, which is the main part of the electronic control system 1500. The processor 1502 may be a multi-processor or a microcontroller.

The processor 1502 is configured to execute program instructions and can read and interpret the wireless signal 434a and wireless power signal 1160. The processor 1502, in response to the interpreted wireless power signal 1160 received from the wireless power transceiver unit 1120, coordinates with to generate various control signals for components (e.g., 403, 406, 413, 414, and 416). The electrical interface 1508 is configured to provide the control signals to the components by means of wired or any other suitable interface.

The electronic control system 1500 also includes a wireless power transceiver unit 1512, antenna/transducer 1514, display panel 1516 and buttons 1518.

The electronic control system 1500 may also include the wireless power transceiver unit 1120 configured to receive the wireless power signal radiated by the power source 1110. A transducer unit or an antenna 1512 may be associated with the power source 1110 and may be interfaced with the electronic control system 1500, for facilitating transmission of power from the power source. In an embodiment, the transducer unit 1512 may be configured based on the configuration of the wireless power transceiver unit 1512 and the type of wireless power transfer. As an e.g. for inductive power transfer, the transducer unit 1512 may be the at least one coil 1120 associated with the power source 1110.

Further, the electronic control system 1500 includes a display panel 1516 for displaying the current working specification and may include buttons 1518 or a touch screen panel for receiving input from the user regarding operation of the device 1300, 1400. Additionally, the display panel 1516 may also display information including, but not limited to the fragrance level, air pump compression ratio and the like.

In an embodiment, the wireless power signal 1160 radiated by the wireless power transceiver unit 1120 of the power source 1110 and the atomizer device 810 can be of such as, but not limited to electromagnetic field, electric field, magnetic field, radio waves, microwaves, and infrared waves.

Various example embodiments of the present disclosure described herein, with reference to various schematic views and block diagrams, are for illustrative purposes and provide numerous advantages and technical effects. For instance, the fragrance diffuser system and its process of converting the fragrance oil into vapors is based on the jet nebulization process. Hence, the process of converting the fragrance oil into vapors does not affect the chemical properties of fragrance oil. Various embodiments offer users an option of controlling the intensity of fragrance in the passenger compartment with the help of their respective user devices. Also, users can select a particular type of fragrance in the passenger compartment by making appropriate selection of diffusing process from among multiple atomizer devices. Moreover, the users can also be notified if the fragrance oil available in the atomizer devices goes below the threshold level. The diffuser systems described herein are configured to disperse fragrance uniformly in the passenger compartment using suitable HVAC vents of the automobile. Additionally, the present disclosure provides a compact device for atomizing and distributing fragrance into the passenger compartment. Also, the present disclosure is modular, scalable and versatile so that the device may be incorporated in any environment.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims.

What is claimed is:

1. An air fragrance diffuser system for use in an automobile, the air fragrance diffuser system comprising:
   an atomizer device storing a fragrance oil;
   an air pressure generating source integrated within the atomizer device for supplying pressurized air within the atomizer device to convert the fragrance oil into vapors; and
   a transmission system coupled to the atomizer device for receiving a mixture of the vapors and the pressurized air and transmitting the mixture into a passenger compartment of the automobile.

2. The air fragrance diffuser system as claimed in claim 1, wherein the air pressure generating source is integrated on a top surface of the atomizer device.

3. The air fragrance diffuser system as claimed in claim 1, wherein the air pressure generating source is integrated on a bottom portion within the atomizer device.

4. The air fragrance diffuser system as claimed in claim 1, wherein the transmission system comprises:
   a conduit pneumatically and fluidically coupled to the atomizer device for receiving the mixture of the vapors and the pressurized air; and
   a ventilation fan configured in a chamber for blowing the mixture into the passenger compartment via a Heating Ventilation and Air Conditioning (HVAC) ventilation line of the automobile.

5. The air fragrance diffuser system as claimed in claim 1, wherein the atomizer device is configured to convert the fragrance oil stored within the atomizer device into the vapors based on a jet nebulization process.

6. The air fragrance diffuser system as claimed in claim 1, further comprising a power source interfaced with the air pressure generating source, the power source is adapted to transfer power to the air pressure generating source for producing the pressurized air.

7. The air fragrance diffuser system as claimed in claim 6, wherein the power source is mounted within the atomizer device and interfaced with the air pressure generating source, for transferring power to the air pressure generating source.

8. The air fragrance diffuser system as claimed in claim 6, wherein the power source is located exterior to the atomizer device and interfaced with the air pressure generating source via a wireless power transceiver unit, the wireless power transceiver unit associated with the air pressure generating source is adapted to receive power from the power source and transfer power to the air pressure generating source wirelessly.

9. The air fragrance diffuser system as claimed in claim 1, further comprising an electronic control system integrated to the atomizer device, communicably coupled to a wireless transceiver associated with a user and to a wireless power transceiver unit, the electronic control system configured to:
control operation of the air pressure generating source;
control operation of the wireless power transceiver unit; and
notify the wireless transceiver of a level of the fragrance oil stored in the atomizer device.

10. An air fragrance diffuser system as claimed in claim 1, wherein the atomizer device comprises:
a sealed enclosed chamber configured to store the fragrance oil and the vapors;
an inlet port mounted on a top surface of the atomizer device, the inlet port configured to receive the pressurized air and route the pressurized air into the sealed enclosed chamber;
a housing having a hollow cylindrical tube positioned below the inlet port, the housing comprising a jet orifice pneumatically coupling the inlet port and the sealed enclosed chamber, the jet orifice configured to receive the pressurized air and route air emanating from the jet orifice to the fragrance oil stored in the sealed enclosed chamber;
a siphon tube positioned within the sealed enclosed chamber, the siphon tube configured to draw the fragrance oil from the sealed enclosed chamber and a portion of the siphon tube comprising an outlet positioned into the housing juxtaposed to the jet orifice to interact with the air emanated from the jet orifice; and
an outlet port positioned on an outer circumferential surface of the atomizer device, the outlet port configured to allow discharge of the mixture into the transmission system.

11. An air fragrance diffuser system, comprising:
a power source;
an electronic control system communicably coupled with a wireless transceiver associated with a user and with a wireless power transceiver unit;
an atomizer device storing a fragrance oil;
an air pump for supplying pressurized air to the atomizer device via a first air delivery conduit, the pressurized air configured to convert the fragrance oil into a fragrance mist,
wherein, the air pump is integrated within the atomizer device and comprises:
an inlet port configured to receive atmospheric air,
a chamber configured to compress the atmospheric air, and
an outlet port configured to deliver the pressurized air to the atomizer device via the first air delivery conduit; and
a transmission system comprising a second air delivery conduit pneumatically and fluidically coupled to the atomizer device for receiving the fragrance mist and configured to transmit the fragrance mist to a passenger compartment of an automobile through a Heating, Ventilation, and Air Conditioning (HVAC) system of the automobile,
wherein the HVAC system comprises an HVAC ventilation chamber pneumatically and fluidically coupled to the second air delivery conduit for receiving the fragrance mist and configured to transmit a mixture of the fragrance mist and an HVAC generated air into an HVAC ventilation line for blowing the mixture into the passenger compartment.

12. The air fragrance diffuser system as claimed in claim 11, wherein the power source is mounted within the atomizer device and interfaced with the air pump, for transferring power to the air pump.

13. The air fragrance diffuser system as claimed in claim 11, wherein the power source is located exterior to the atomizer device and interfaced with the air pump via the wireless power transceiver unit, the wireless power transceiver unit associated with the air pump and adapted to receive power from the power source and transfer power to the air pump wirelessly.

14. An air fragrance diffuser system for an automobile, comprising:
a power source;
an electronic control system communicably coupled with a wireless transceiver associated with a user of the automobile and to a wireless power transceiver unit; and
a plurality of atomizer devices, each of the plurality of atomizer devices comprising an inlet port and an outlet port;
at least one air pump integrated within each of the plurality of atomizer devices, each of the at least one air pump configured to supply pressurized air to each of the plurality of atomizer devices via a first electronic valve hub for converting a fragrance oil stored within each of the plurality of atomizer devices into a fragrance mist via the pressurized air,
wherein the first electronic valve hub comprises an inlet and a plurality of outlets, the first electronic valve hub is pneumatically coupled to a first air delivery conduit coupled to each of the at least one air pump for receiving the pressurized air and configured to be electronically controlled by the electronic control system for selectively transmitting the pressurized air through the plurality of outlets;
a second electronic valve hub comprising a plurality of inlets and an outlet, wherein each of the plurality of inlets are pneumatically and fluidically coupled to each output ports of the plurality of atomizer devices for receiving the fragrance mist; and
a transmission system pneumatically and fluidically coupled to the outlet of the second electronic valve hub for receiving the fragrance mist and routing the fragrance mist to a passenger compartment of the automobile.

15. The air fragrance diffuser system as claimed in claim 14, wherein the power source is mounted within one of the plurality of atomizer devices and interfaced with each of the at least one air pump, for transferring power.

16. The air fragrance diffuser system as claimed in claim 14, wherein the power source is located exterior to one of the plurality of the atomizer devices and interfaced with each of the at least one air pump via the wireless power transceiver unit, the wireless power transceiver unit associated with each of the at least one air pump and is adapted to receive power from the power source and transfer power to each of the at least one air pump wirelessly.

17. The air fragrance diffuser system as claimed in claim 14, wherein the electronic control system is configured to selectively power ON and power OFF the power source, or selectively enable and disable the wireless power transceiver unit interfaced with each of the at least one air pump for controlling supply of power to each of the at least one air pump.

18. The air fragrance diffuser system as claimed in claim 14, wherein each output port of the plurality of atomizer devices comprises one or more baffle disks disposed on inner periphery of the output port, wherein the one or more baffle disks are configured to swing between an open position and a closed position in response to a control signal received from the electronic control system, wherein in the closed position, the one or more baffle disks block a flow of the fragrance mist.

19. The air fragrance diffuser system as claimed in claim 17, wherein upon receipt of preference input for fragrance from the wireless transceiver, the electronic control system is configured to selectively control positions of the one or more baffle disks to control flow of the fragrance mist originated from the plurality of atomizer devices.

20. The air fragrance diffuser system as claimed in claim 14, wherein each atomizer device of the plurality of atomizer devices comprises a fluid level sensor communicably coupled to the electronic control system, wherein the electronic control system upon receipt of a fluid level indicator, transmits a reading of the fluid level indicator to the wireless transceiver.

* * * * *